(12) United States Patent
Herrera et al.

(10) Patent No.: US 11,619,462 B2
(45) Date of Patent: *Apr. 4, 2023

(54) GUN TEMPERATURE IDENTIFICATION SYSTEM AND METHODS OF USE THEREOF

(71) Applicant: Caveman, LLC, Severance, CO (US)

(72) Inventors: Frank Herrera, Fort Collins, CO (US); Michael Wilkey, Severance, CO (US)

(73) Assignee: Caveman, LLC, Severance, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,102

(22) Filed: Jan. 11, 2021

(65) Prior Publication Data
US 2021/0156636 A1 May 27, 2021

Related U.S. Application Data

(63) Continuation-in-part of application No. 16/410,168, filed on May 13, 2019, now Pat. No. 10,890,398, which is a continuation of application No. 15/493,543, filed on Apr. 21, 2017, now Pat. No. 10,352,641.

(51) Int. Cl.
| | | |
|---|---|---|
| *F41A 21/00* | (2006.01) | |
| *F41A 35/00* | (2006.01) | |
| *G01K 1/14* | (2021.01) | |
| *G01K 13/00* | (2021.01) | |
| *G01K 1/02* | (2021.01) | |
| *G01K 11/12* | (2021.01) | |

(52) U.S. Cl.
CPC .............. *F41A 21/00* (2013.01); *F41A 35/00* (2013.01); *G01K 1/028* (2013.01); *G01K 1/14* (2013.01); *G01K 11/12* (2013.01); *G01K 13/00* (2013.01)

(58) Field of Classification Search
USPC .................................................. 374/159, 141
See application file for complete search history.

(56) References Cited

U.S. PATENT DOCUMENTS

| | | |
|---|---|---|
| 5,659,148 A | 8/1997 | Isgen |
| 2004/0148839 A1 | 8/2004 | Hermanson et al. |
| 2006/0203877 A1 | 9/2006 | Heyman et al. |
| 2008/0121827 A1 | 5/2008 | Cerwin et al. |
| 2010/0111133 A1 | 5/2010 | Yuhas et al. |

(Continued)

FOREIGN PATENT DOCUMENTS

| | | | |
|---|---|---|---|
| KR | 102093449 B1 | * | 3/2020 |
| RU | 2689085 C1 | * | 5/2019 |

OTHER PUBLICATIONS

Translation of KR 102093449B1 (Year: 2020).*
Definition of thermochromic, Merriam Webster Dictionary.

*Primary Examiner* — Mirellys Jagan
(74) *Attorney, Agent, or Firm* — Berg Hill Greenleaf Ruscitti LLP

(57) ABSTRACT

The inventive technology comprises a novel thermal indicator system that incorporates one or more thermogenic compounds that may be applied to a gun component and indicate the temperature of a gun component during and after use. This novel thermal indicator system may indicate the temperature at which the gun component will cause burns, is unsafe to store, or if a pre-determined threshold temperature has been reached resulting in a loss of firing accuracy, as well as imminent, or actual component failure.

15 Claims, 20 Drawing Sheets

(56) References Cited

U.S. PATENT DOCUMENTS

| | | | |
|---|---|---|---|
| 2014/0034756 A1* | 2/2014 | Gantenbein | G01K 13/02 239/416.1 |
| 2016/0123687 A1* | 5/2016 | Cook, Jr. | F41H 3/00 42/50 |
| 2016/0376090 A1* | 12/2016 | Armes | B29B 7/7409 222/394 |
| 2017/0320089 A1* | 11/2017 | Seferi | B05C 17/0053 |
| 2021/0254921 A1* | 8/2021 | Spector | F41A 21/30 |

* cited by examiner

GUN TEMPERATURE IDENTIFICATION SYSTEM AND METHODS OF USE THEREOF

CROSS-REFERENCE TO RELATED APPLICATIONS

This application is a continuation-in-part of U.S. application Ser. No. 16/410,168, filed May 13, 2019, which is a continuation application of U.S. application Ser. No. 15/493,543, filed Apr. 21, 2017, the disclosure of which is incorporated herein by reference.

TECHNICAL FIELD

Generally, the inventive technology disclosed herein relates to techniques, systems, methods and apparatus for providing a weapon mounted thermal indicator system.

BACKGROUND OF THE INVENTION

Repeated firing of a gun, and in particular modern rapid-firing sport rifles, can result in excessive heating of the gun's components, such as the receiver, or barrel among other. Each fired cartridge can result in a discharge of thermal energy reaching approximately 5000° Fahrenheit. While some of this thermal energy is released outward from the end of the barrel, a significant amount of heat is transferred to the receiver and barrel. Excessive temperature in a gun component can be associated with a loss of firing accuracy, increased barrel erosion, and degradation of internal rifling. Excessive heating over a prolonged period of time can result in warping as well as a catastrophic component failure. This level of excessive heating may require replacement of the component, which can be expensive and inconvenient for most individuals.

In one example, excessive gun component heating, and in particular gun barrel heating, may also raise concerns with respect to personal safety. For example, firing multiple rounds from a gun can result in an external temperature capable of severe burns to a user. As demonstrated below, for a standard M16-A1 rifle, a relative of the modern AR-15, a firing rate of 20 rounds every 5 seconds for a period of 35 seconds can result in an external barrel temperature of approximately 800° Fahrenheit. Even at a rate of 1 round every 5 seconds for a period of 140 seconds can result on an average barrel temperature of 600° Fahrenheit.

| Firing round | Barrel temperature (° F.) after 140 rounds | | |
|---|---|---|---|
| | 5" from muzzle | 3" | 1" |
| 1 (1 rd, 6 sec., M193) | N/A | 386 | 354 |
| 2 (1 rd, 3 sec., M193) | 381 | 502 | 466 |
| 3 (1 rd, 1 sec., M193) | 586 | 685 | 613 |
| 4 (20 rd, 20 sec., M193) | 590 | 702 | 620 |
| 5 (20 rd, 10 sec., M193) | 657 | 763 | 670 |
| 6 (20 rd, 5 sec., M193) | N/A | 799 | N/A |
| 7 (1 rd, 1 sec., M196) | 562 | 655 | 580 |
| 8 (20 rd, 20 sec., M196) | 562 | 695 | 588 |

Source: National Technical Information Service

For an average adult, contacting a surface of only 151° Fahrenheit can result in a first degree burn, while contact of the same surface for 2 seconds could result in second and/or third degree burns.

Excessive gun component heating may also raise concerns with respect to gun storage. As noted above, a gun barrel can rapidly reach temperatures that can melt many common fabrics and other materials used in gun storage bags/containers. For example, as shown below, even inadvertent contact with a heated gun barrel can destroy most common fabric and materials.

| | |
|---|---|
| Nylon 6 | melting point 374-663° F. |
| PVC Material | Melting point 212-500° F. |
| Polyester Fabrics | Melting point approximately 482° F. |
| Cotton | decomposes 300° F. |

Traditionally, gun users would simply wait a period of time until they believed the gun component was sufficiently cool to touch and/or store. In these cases, gun users would often be forced to risk serious burns by touching the gun component to confirm its temperature.

The foregoing problems regarding excessive gun component heating may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree, an unexpected result of the approach taken by some in the field.

BRIEF DESCRIPTION OF THE DRAWINGS

The above and other aspects, features, and advantages of the present disclosure will be better understood from the following detailed descriptions taken in conjunction with the accompanying figures, all of which are given by way of illustration only, and are not limiting the presently disclosed embodiments, in which.

SUMMARY OF THE INVENTION

Figure 1:
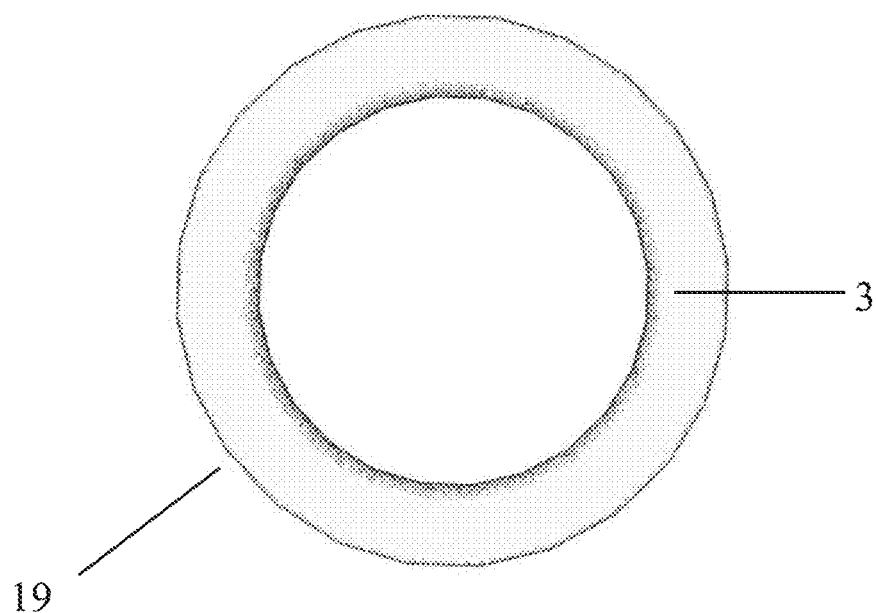
FIG. 1—is a front view of a thermochromic band in one embodiment thereof.

The inventive technology comprises a novel gun barrel thermal indicator system that incorporates one or more thermogenic compounds that may be coupled to a gun barrel and indicate the temperature of a gun barrel during and after use. Additional embodiments may comprise a digital gun barrel thermal indicator system that may be coupled to a gun barrel and digitally indicate the temperature of a gun barrel during and after use. This novel gun barrel thermal indicator system may indicate the temperature at which the gun barrel will cause burns, is unsafe to store, or if a pre-determined threshold temperature has been reached resulting in a loss of firing accuracy, as well as imminent and/or actual barrel failure.

One aim of the current inventive technology is to provide a flexible thermochromic gun barrel temperature indicator. In a preferred embodiment, this system may include a quantity of one or more thermochromic indicators that may be impregnated within a flexible thermochromic band and calibrated such that the thermal energy generated from a gun barrel during use may causes the thermochromic indicator(s) to transmit a temperature signal when the thermal energy reaches at least one pre-determined temperature threshold. One or more of these thermochromic bands may be configured to be secured around a gun barrel such that the thermal energy generated within the gun barrel is transferred to the thermochromic band.

Another aim of the current inventive technology is to provide a gun barrel thermal indicator. In a preferred embodiment, this system may include at least one barrel coupler configured to be secured with a gun barrel such that thermal energy generated within the gun barrel is transferred to the barrel coupler. At least one thermochromic indicator may be secured to, coupled with, or impregnated in the barrel coupler and calibrated such that the thermal energy generated from a gun barrel causes the thermochromic indicator(s) to transmit a temperature signal.

Yet another aim of the current inventive technology is to provide a digital gun barrel thermal indicator. In a preferred embodiment, this system may include at least one barrel coupler configured to be secured with a gun barrel such that thermal energy generated within the gun barrel is transferred to the barrel coupler. This barrel coupler may include a sensor configured to detect and transmit the temperature of the barrel coupler and/or gun barrel to a processor which may then be converted into a digital temperature indication. In this embodiment, a digital display on the barrel coupler, or a separate display screen, may broadcast this digital temperature indication.

Further aims of the inventive technology include gun temperature identification system. In this preferred embodiment, a thermochromic indicator may be applied to the surface of a gun component, such as a barrel or receiver, such that thermal energy generated within the gun component is transferred to the thermochromic indicator causing it to transmit a temperature signal when said thermal energy from the gun component reaches a pre-determined temperature threshold. In this preferred embodiment, a thermochromic indicator may include one or more of the following: a thermochromic powder coat applied to the gun component; a thermochromic paint applied to the gun component; a thermochromic sticker applied to the gun component; and a thermochromic vinyl wrap applied to the gun component.

Other aspects and features of the present invention will become apparent to those ordinarily skilled in the art upon review of the following descriptions of specific embodiments of the invention in conjunction with the accompanying figures.

DETAILED DESCRIPTION OF THE INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

The inventive technology may include a flexible barrel thermal indicator (1). In this embodiment, a pliable material, such as rubber or other flexible polymer may be impregnated or coated with one or more thermochromic indicators (3) forming a thermochromic band (19). Examples of thermochromic indicators (3) may include any substance, compound or mixture that may undergo some type or perceivable transformation in response to heat, in this case, heat being conducted from a gun barrel. Examples of specific thermochromic indicators (3) may include, but not be limited to: thermochromic paint, thermochromic dyes, a temperature strip, thermochromic chemicals; thermochromic strips, thermochromic pigments; and thermochromic coatings.

Figure 2:
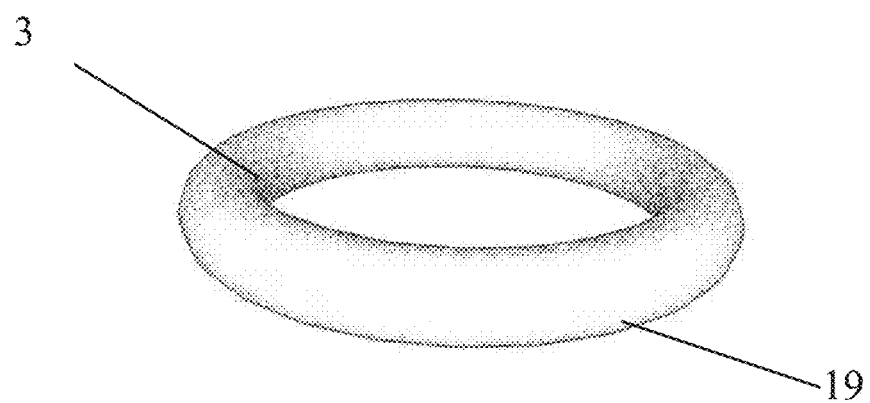
FIG. 2—is a perspective view of a thermochromic band in one embodiment thereof.
Figure 3:
FIG. 3—is a side view of a thermochromic band in one embodiment thereof.
Figure 4:
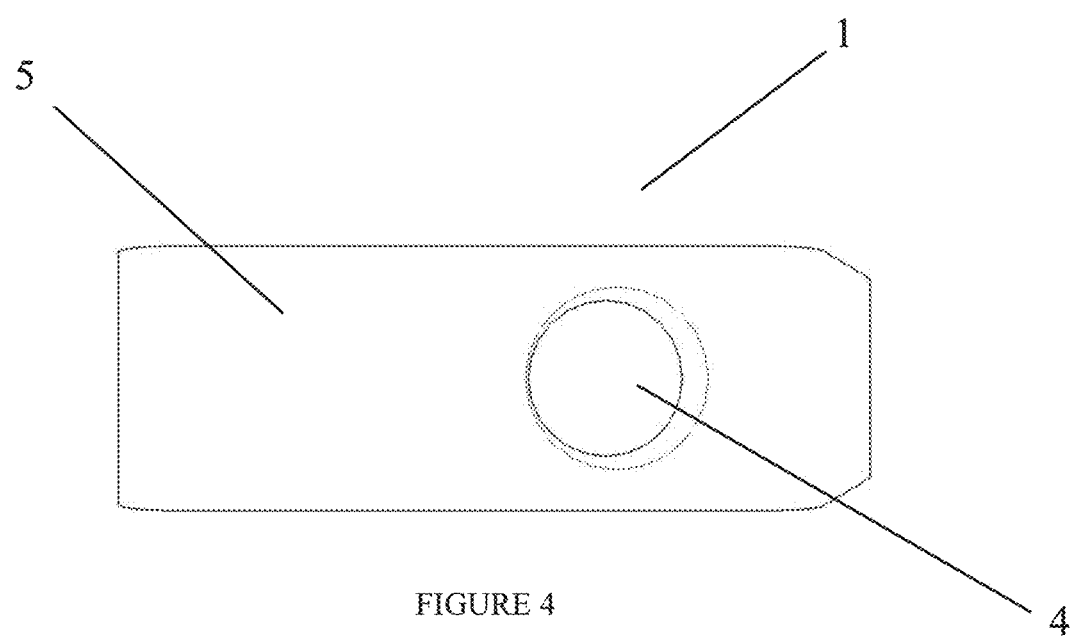
FIG. 4—is a side view of a barrel thermal indicator in one embodiment thereof.
Figure 5:
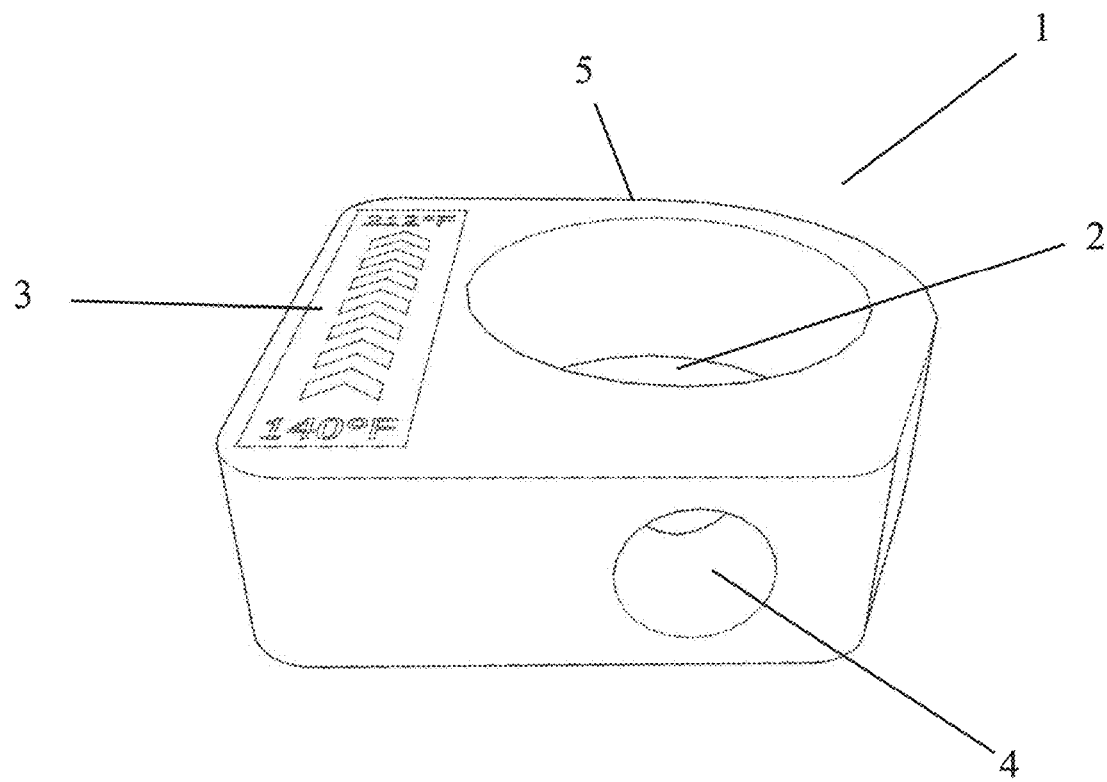
FIG. 5—is a perspective view of a barrel thermal indicator in one embodiment thereof.
Figure 6:
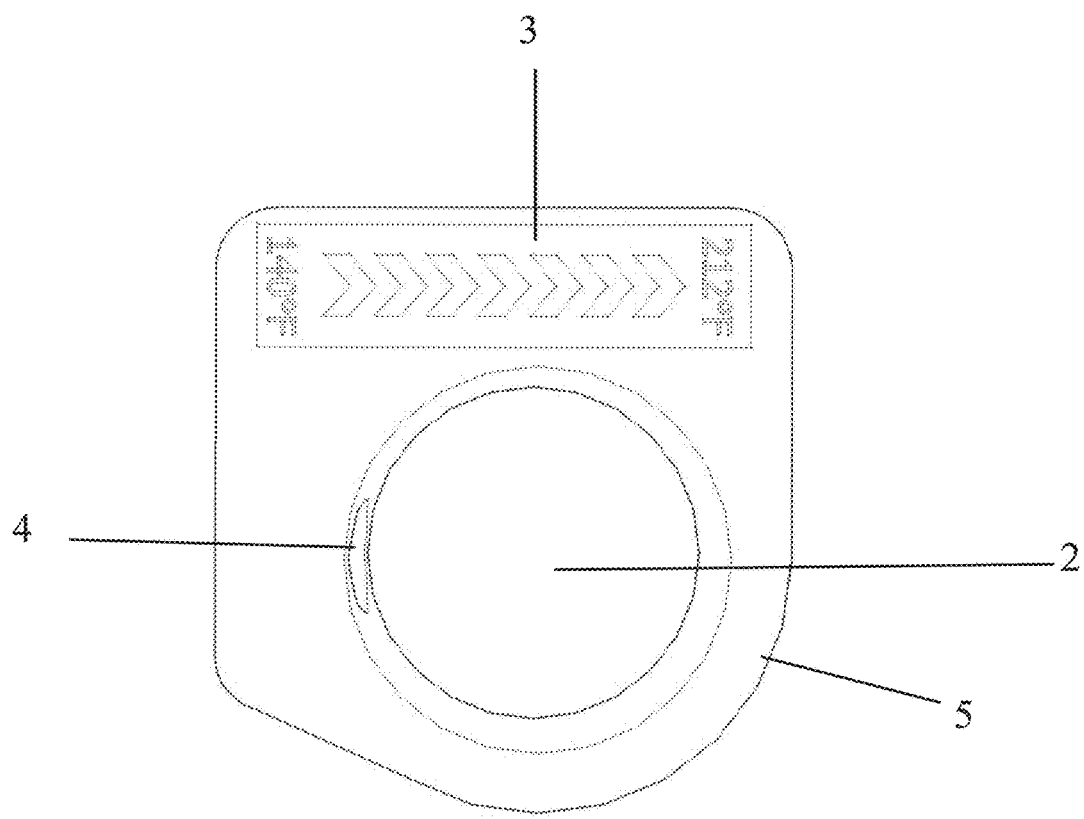
FIG. 6—is a front perspective view of a barrel thermal indicator in one embodiment thereof.
Figure 7:
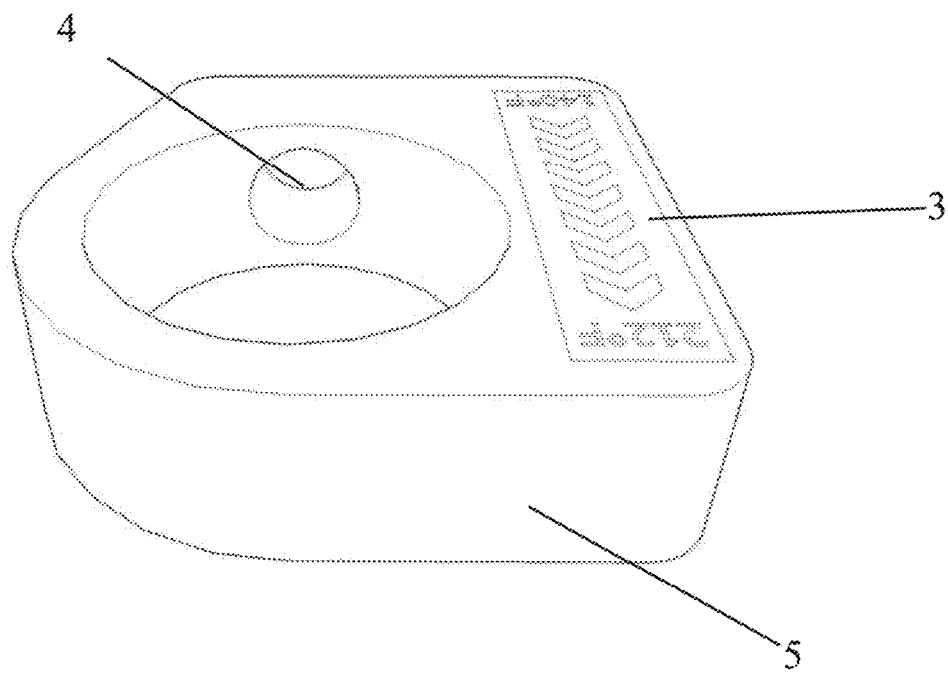
FIG. 7—is a back perspective view of a barrel thermal indicator in one embodiment thereof.

Generally referring to FIGS. 1-3, a thermochromic band (19) may be formed into a circular configuration that may be placed over the barrel of a gun or rifle—the terms being generally interchangeable. In this embodiment, the flexible thermochromic band (19) may be sufficiently pliable to be able to expand to accommodate placement over a barrel having a muzzle break, suppressor, compensator, silencer, or other secondary attachments. In this configuration, a user may be able to view the thermochromic band (19) while firing the gun, but it will not interfere with the user's sight-line. Additionally, being in physical, or close to physical contact with the external surface of the gun barrel, heat generated from the discharge of rounds from the gun may be conducted to the thermochromic band (19) which may cause the thermochromic indicator (3) to undergo a perceivable transformation in response to a change in thermal energy and thereby transmit a temperature signal.

In a preferred embodiment, a quantity of thermochromic indicator (3) may be impregnated within a thermochromic band (19) and calibrated such that the thermal energy generated from the gun barrel may cause one or more thermochromic indicators (3) to change color thereby transmitting a temperature signal when the thermal energy from the gun barrel reaches at least one pre-determined temperature threshold. In this embodiment, a pre-determined temperature threshold may be determined by the type or amount of thermochromic indicator(s) (3) used. For example, one thermochromic indicator (3) may transmit a temperature signal at 100° Fahrenheit, while another thermochromic indicator (3) may transmit a temperature signal at 300° Fahrenheit. In certain embodiments, a single thermochromic indicator(s) (3) may be used, while in other alternative embodiments a plurality of thermochromic indicators (3), each having a distinct temperature signal may be incorporated into the thermochromic band (19).

The use of thermochromic indicator(s) (3) may be calibrated. In this embodiment, the thermochromic indicator (3) impregnated within a thermochromic band (19) may be calibrated to account for the type of thermochromic indicator (3), the quantity of thermochromic indicator (3), the gun barrel thickness, the type thermochromic band (19) material, the amount of thermal thermochromic band (19) material used, and/or the heat transfer coefficient variation in the gun barrel. This calibration may allow the thermal energy generated from the gun barrel to cause the thermochromic indicator (3) to transmit a temperature signal when said thermal energy from a gun barrel reaches at least one pre-determined temperature threshold.

A plurality of pre-determined temperature thresholds may be contemplated within the scope of this invention. For example, a pre-determined temperature threshold may include a touch temperature threshold. In this embodiment, at a temperature where the thermal energy generated from a gun barrel, may be sufficient to cause minor or even serious burns, the thermochromic band (19) may transmit a burn temperature signal by changing color. This signal may visually alert the user to: 1) not touch the barrel; or 2) reduce the firing rate; or 3) stop firing the gun. Alternatively, at a temperature where the thermal energy generated from a gun barrel has sufficiently dissipated so as to be safe to touch, the thermochromic band (19) may transmit a temperature signal by changing color or reverting to its original color. This signal may visually alert the user that: 1) the barrel is safe to touch; and 2) the gun is safe to fire.

Additional pre-determined temperature thresholds may be contemplated within the scope of this invention. For example, a pre-determined temperature threshold may include a store temperature threshold. In this embodiment, at a temperature where the thermal energy generated from the gun barrel is sufficient to cause damage to materials that may come into contact with the gun barrel during storage, the thermochromic band (19) may transmit a store or storage temperature signal by changing color. This signal may visually alert the user to: 1) not store the gun where the barrel may come into contact with other materials; or 2) reduce the firing rate; or 3) stop firing the gun. Alternatively, at a temperature where the thermal energy generated from the gun barrel has sufficiently dissipated so as to be safe to store, the thermochromic band (19) may transmit a temperature signal by changing color or reverting to its original color. This signal may visually alert the user that the gun is safe to store.

Along these lines, additional embodiments may include other pre-determined temperature thresholds such as a firing accuracy temperature threshold, an imminent barrel failure temperature threshold, and a barrel failure temperature threshold. As noted above, a plurality of thermochromic indicators (3) may be impregnated within a thermochromic band (19). These thermochromic indicators (3) may be different compounds or mixtures of compounds or they may be differentially calibrated to transmit differential temperature signals.

For example, in one embodiment, a thermochromic band (19) may be impregnated or coated with three thermogenic indicators (3). A first thermogenic indicator (3) may transmit a temperature signal by a color change when the gun barrel has reached a pre-determined temperature threshold that will cause burns. Another thermogenic indicator (3) may transmit a temperature signal by a different color change when the gun barrel has reached a pre-determined temperature threshold that makes it unsafe to store the gun. A third thermogenic indicator (3) may transmit a temperature signal by a different color change when the gun barrel has reached a pre-determined temperature threshold that indicates barrel failure has occurred or is imminent. Such temperature signals may be overlapping and/or sequential or may occur at distinct positions in the thermochromic band (19). Naturally, multiple other thermogenic indicators (3) may be used simultaneously in other embodiments. Additional embodiments may include a thermochromic band (19) that may transmit a color change temperature signal when a pre-determined threshold has been met, where the resulting color change may spell a word, or indicate a number, such as the temperature the barrel has reached.

Additional embodiments may provide a pre-generated calibration guide. In this embodiment, a user may identify the make and model of gun being used and cross-reference that information with the guide. This guide may consider the various types of gun barrels, materials used, barrel thicknesses, the heat transfer coefficient variations in the gun barrel, as well as differential heating patterns along the length of the barrel. The user may evaluate this information in selecting one or more thermochromic bands (19) that would be most appropriate for that particular gun barrel. This guide may further promote a user to position the thermochromic band (19) at a certain position along the gun barrel.

Additional embodiments of the inventive technology may include a barrel thermal indicator (1) having one or more barrel couplers (5) that may be coupled/secured with and/or over a gun barrel. In one preferred embodiment, a barrel coupler (5) may be specifically configured to be secured or coupled with a gun barrel such that thermal energy generated within a gun barrel is transferred to a barrel coupler (5). Generally referring to FIGS. 4-17, in this preferred embodiment, a barrel coupler (5) may be configured with a barrel aperture (2) that may correspond to the approximate size and/or shape of a gun barrel. A barrel coupler (5) may be secured to a gun barrel by inserting the gun barrel through the barrel aperture (2) and sliding the barrel coupler (5) along the length of the barrel until it is positioned at a desired location. As shown in the figures, in this embodiment, the internal surface of the barrel aperture (2) may be configured to maintain consistent contact with the external surface of a gun barrel. In this configuration thermal energy generated within the gun barrel may be efficiently transferred or conducted to the barrel coupler (5).

While initially shown as a single unitary component, in certain embodiments, a barrel coupler (5) may be formed from one or more disparate components that may be joined together and coupled with a gun barrel. A barrel coupler (5) may also be formed using a variety of materials, including metals such as aluminum, cooper, brass, and steel, as well as plastic, and various other composites.

In one embodiment, a barrel coupler (5) may include a barrel lock that may be configured to securely couple the barrel coupler (5) to the gun barrel. In this embodiment, a barrel lock may include a cam-action lock that may secure the barrel coupler (5) to the gun barrel, while other embodiments may include a fastener that may be inserted into the barrel coupler (5) and further secured to a gun barrel or other component.

As shown in FIGS. 4-17, a barrel coupler (5) may include one or more barrel apertures (4) that may be configured to accept a fastener or screw. In this embodiment, a barrel coupler (5) may be positioned over a gun barrel and a fastener or screw may be threaded through the barrel aperture (4) and the distal portion of the fastener or screw may contact the external surface of the gun barrel and secure the barrel coupler (5) in position. In certain other embodiments, the distal end of a fastener or screw may be padded, such that it may be coated with an elastomeric or other compressible material that may act as a buffer between the fastener or screw and the surface of the barrel so as to prevent scratching or other damage. The inventive technology includes additional mechanical configurations that may be used to secure a barrel coupler (5) to a gun barrel. For example, a barrel coupler (5) may be secured with a gun barrel by: a clamp; a magnet; a quick-release lock; a biased-spring; a snap coupler; a slide coupler; or a twist coupler and the like.

The inventive technology may include a barrel coupler (5) being coupled with one or more thermochromic indicators (3). A thermochromic indicator (3) may include any substance, compound of mixture that may undergo some type or perceivable transformation in response to thermal energy, in this case heat being conducted from a gun barrel into a barrel coupler (5). Examples of thermochromic indicators (3) may include, but not be limited to: thermochromic paint, thermochromic dyes, thermochromic chemicals; thermochromic strips, thermochromic pigments, and other thermochromic coatings.

Referring to FIGS. 5-8, in one embodiment, a barrel coupler (5) may include a thermochromic indicator (3) in the form of a thermochromic strip. In this preferred embodiment, a thermochromic strip may be transiently or permanently positioned within a thermochromic indicator channel (20) or to the surface of a barrel coupler (5). In this embodiment, thermal energy generated by the discharge of rounds from the gun may be transmitted to the gun barrel and then further conducted to the barrel coupler (5). The thermal energy may be further transmitted to the thermochromic indicator (3), in this case a thermochromic strip. As the temperature of the barrel coupler (5) increases, the thermochromic indicator (3) may transmit a temperature signal. In the specific embodiment shown in FIGS. 5-8, the thermochromic indicator (3) may be a gradated thermochromic strip such that as the temperature of the barrel coupler (5) increases, each distinct segment, having a thermochromic indicator material that may be calibrated to sequentially transmit temperature signals when a temperature threshold is reached.

Examples of additional pre-determined temperature thresholds may include, but not be limited to: a temperature threshold that may cause a burn, a temperature threshold that may cause a $1^{st}$ degree burn, a temperature threshold that may cause a $2^{nd}$ degree burn, a temperature threshold that may cause a $3^{rd}$ degree burn, a temperature threshold where a gun or gun barrel should not come into contact with other materials, a temperature threshold where a gun or gun barrel should not be stored, or cannot be stored safely; a temperature threshold where a barrel should be replaced, repaired or evaluated for damage, a temperature threshold where firing accuracy may be lost or affected, a temperature threshold where an imminent barrel failure may occur, and a temperature threshold where a barrel failure has, or may have occurred.

Figure 8:
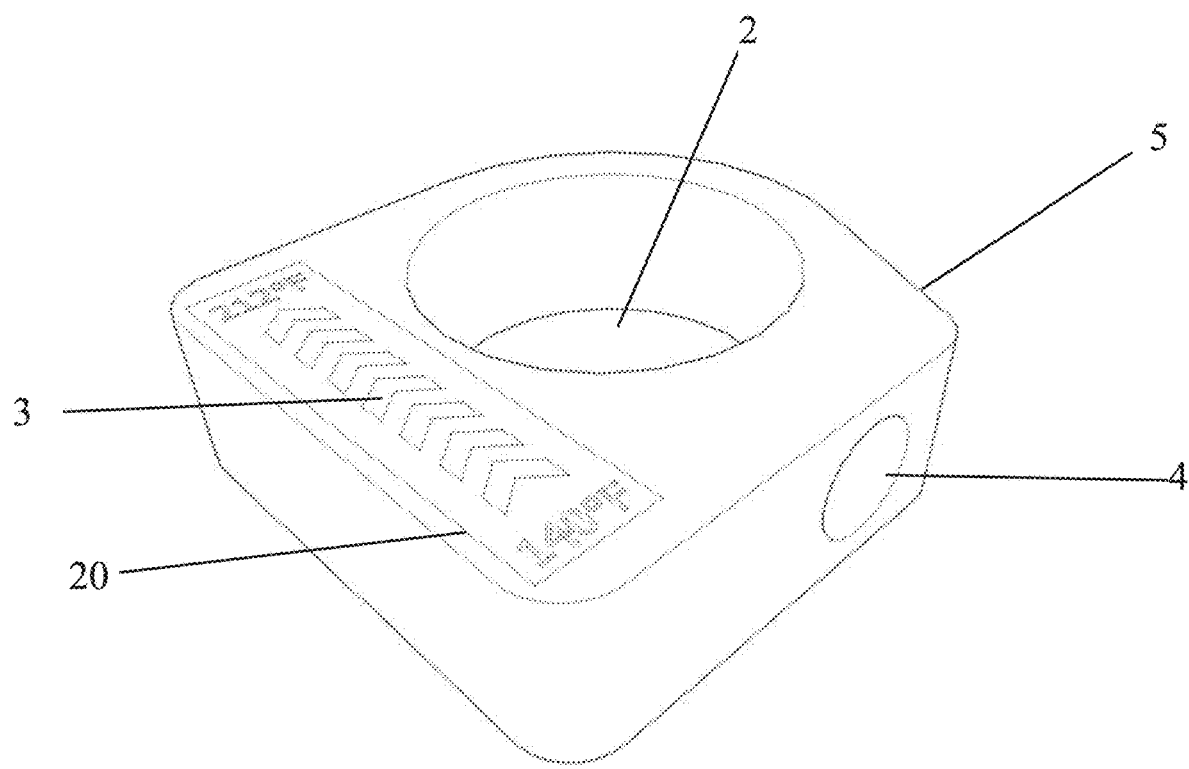
FIG. 8—is a perspective view of a barrel thermal indicator in one embodiment thereof.
Figure 9:
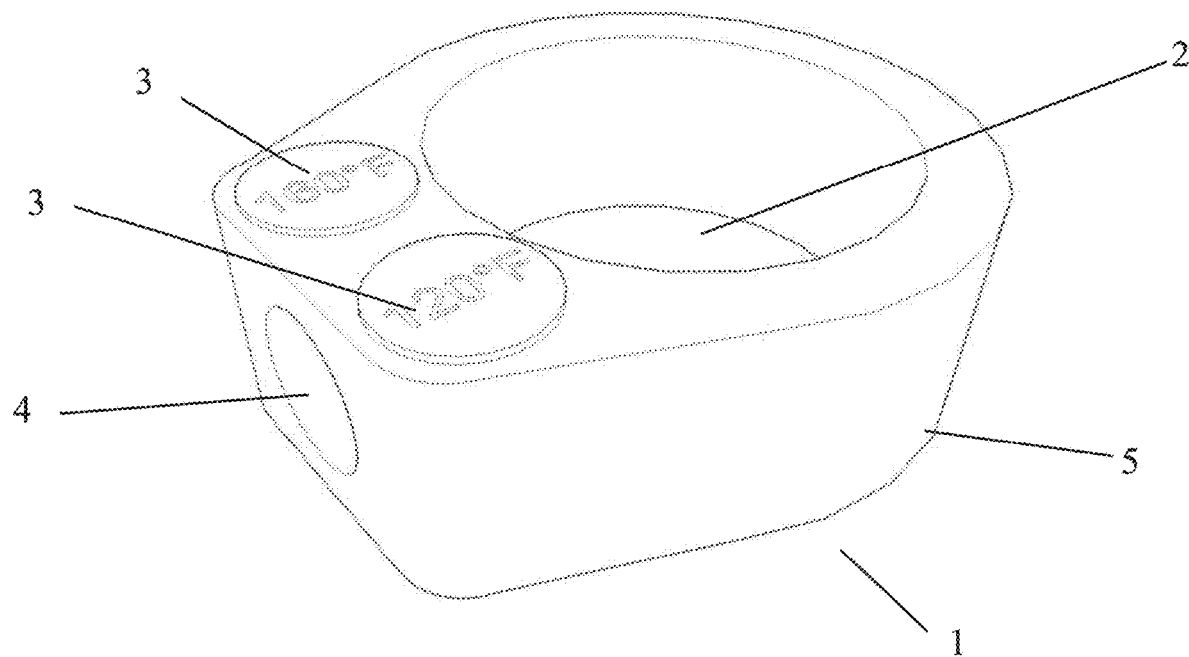
FIG. 9—is a perspective view of a barrel thermal indicator in one alternative embodiment thereof.
Figure 10:
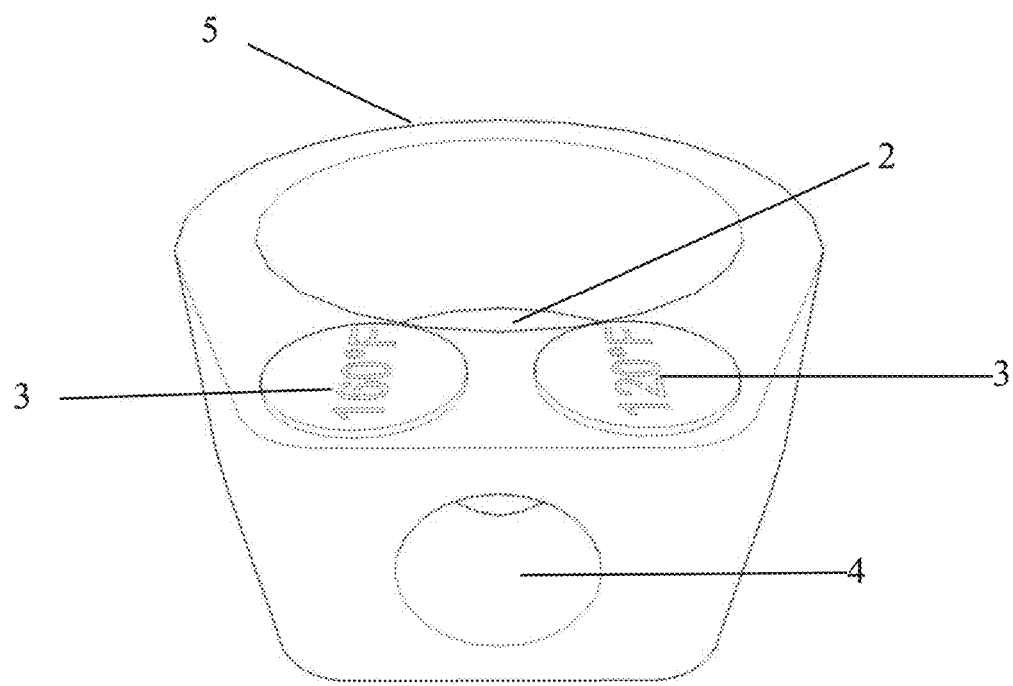
FIG. 10—is a side perspective view of a barrel thermal indicator in one alternative embodiment thereof.
Figure 11:
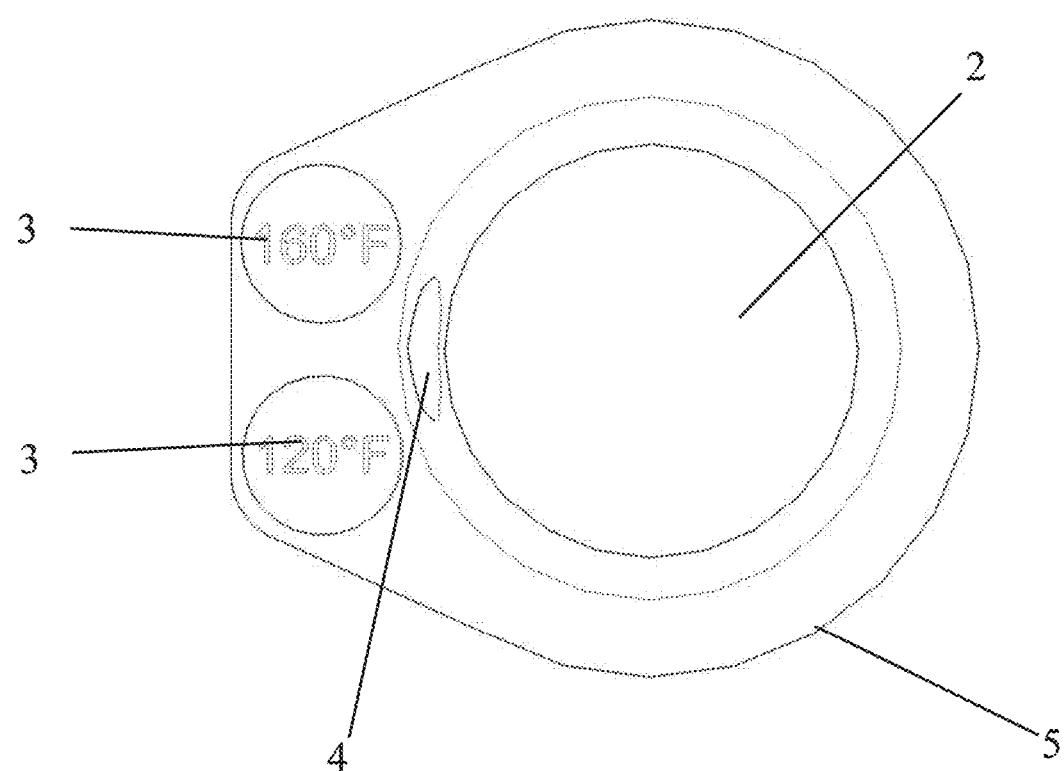
FIG. 11—is a front view of a barrel thermal indicator in one alternative embodiment thereof.
Figure 12:
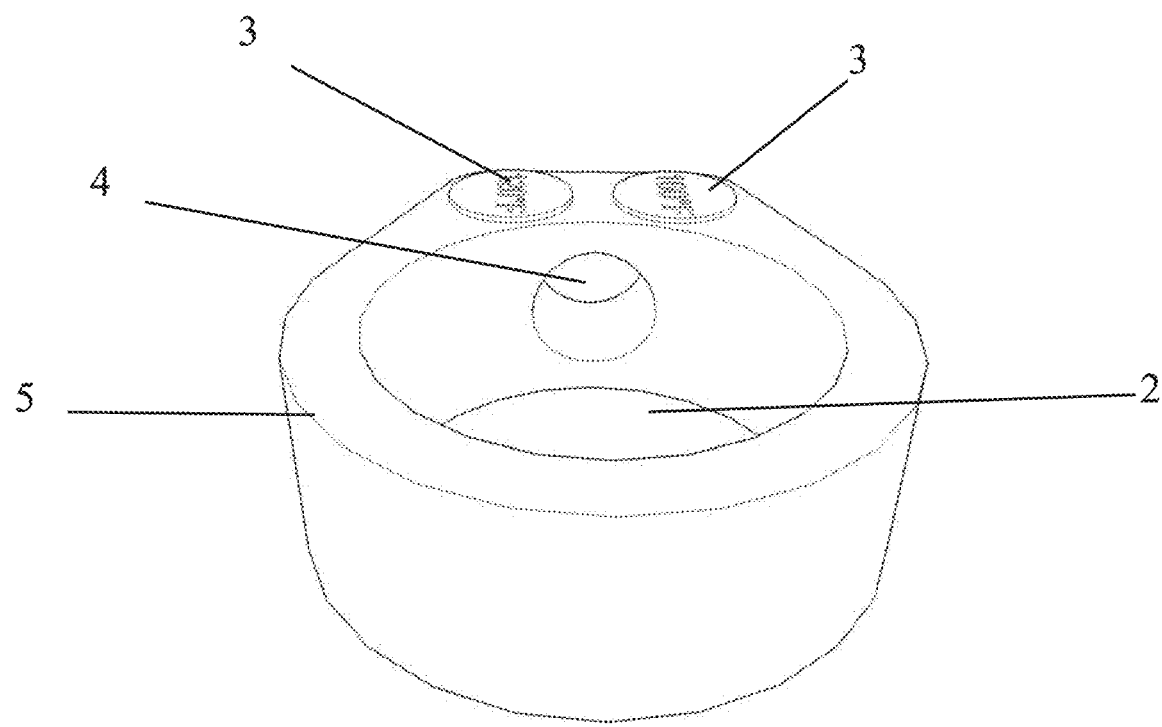
FIG. 12—is a back perspective view of a barrel thermal indicator in one alternative embodiment thereof.
Figure 13:
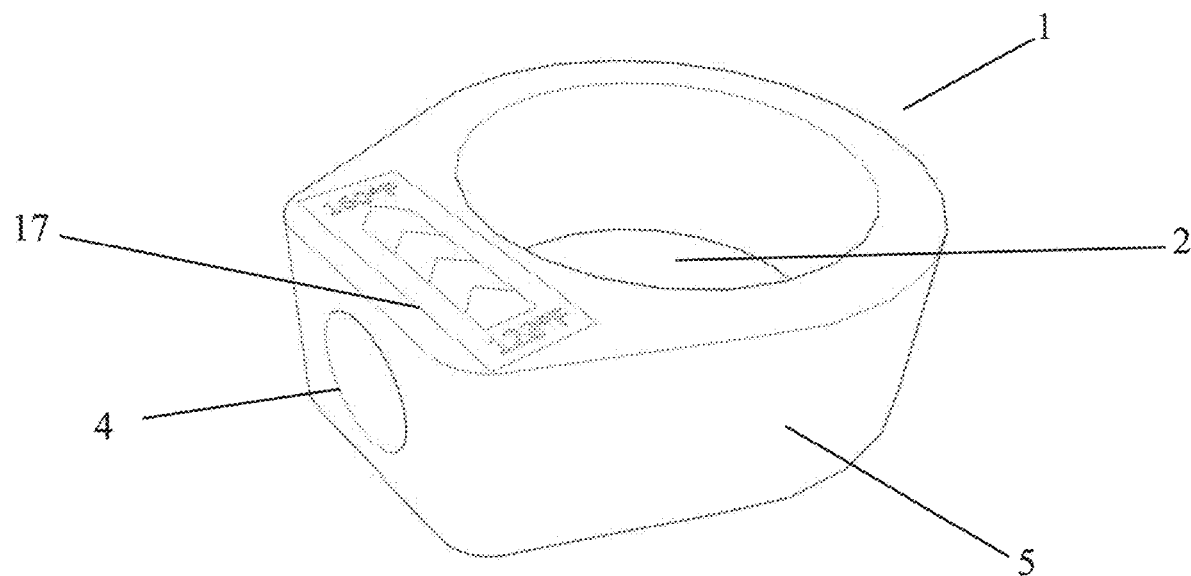
FIG. 13—is a perspective view of a barrel thermal indicator in another alternative embodiment thereof.
Figure 14:
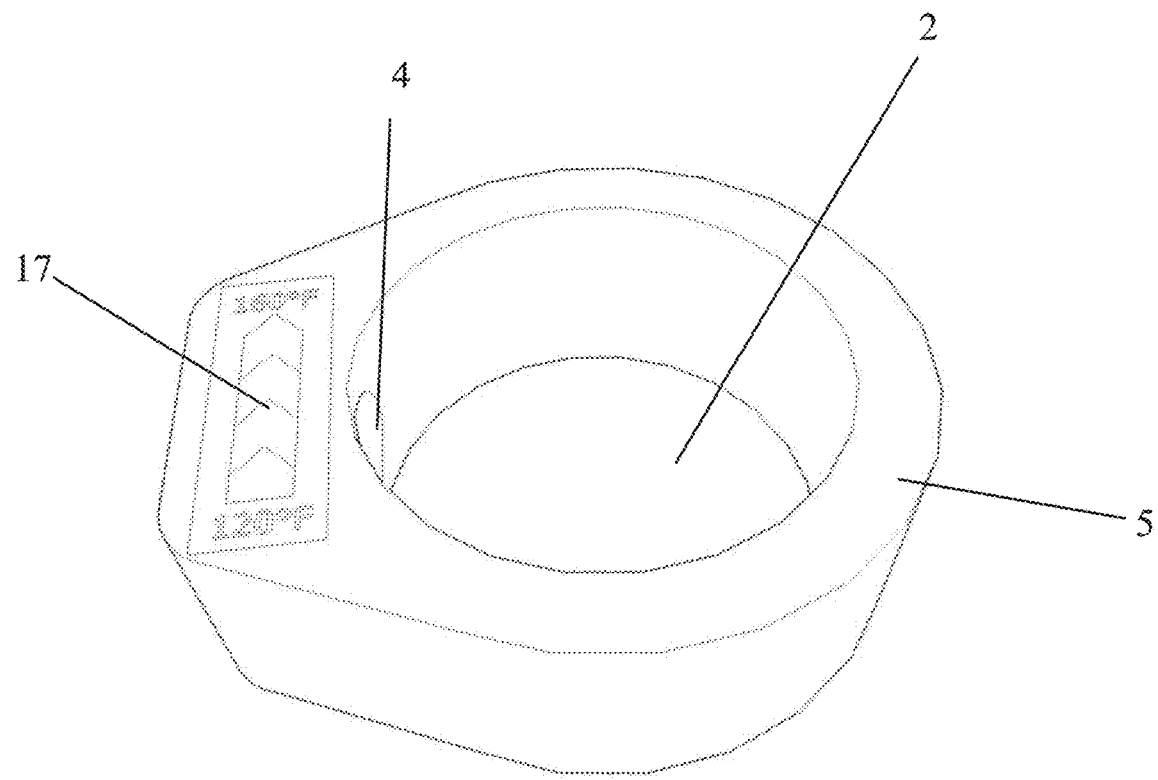
FIG. 14—is a front perspective view of a barrel thermal indicator in another alternative embodiment thereof.
Figure 15:
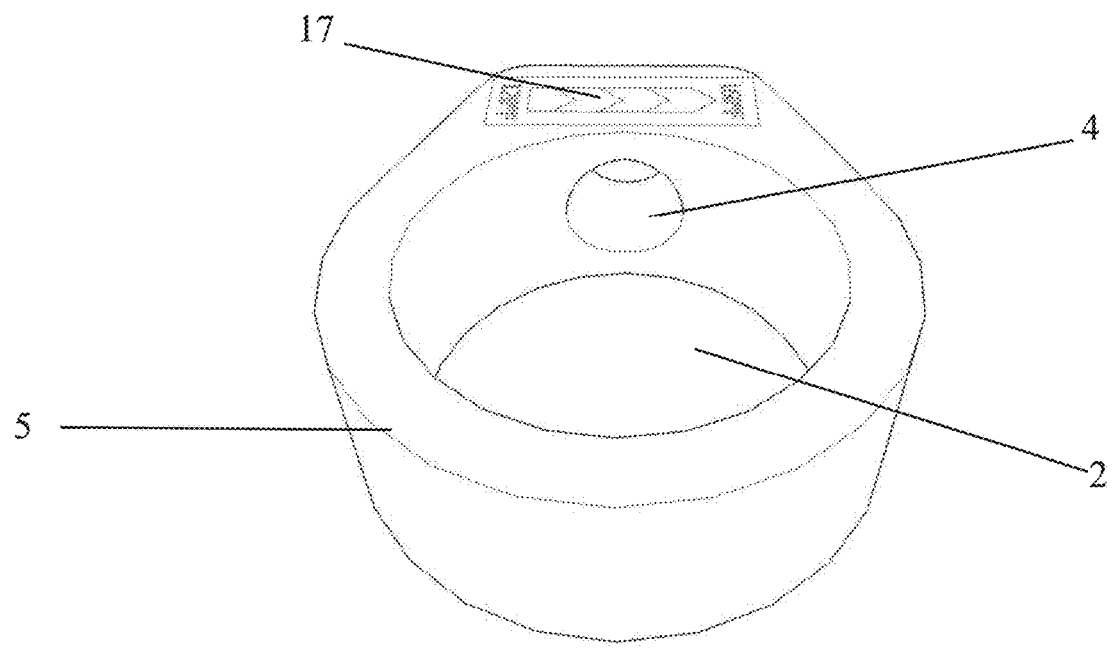
FIG. 15—is a back perspective view of a barrel thermal indicator in another alternative embodiment thereof.
Figure 16:
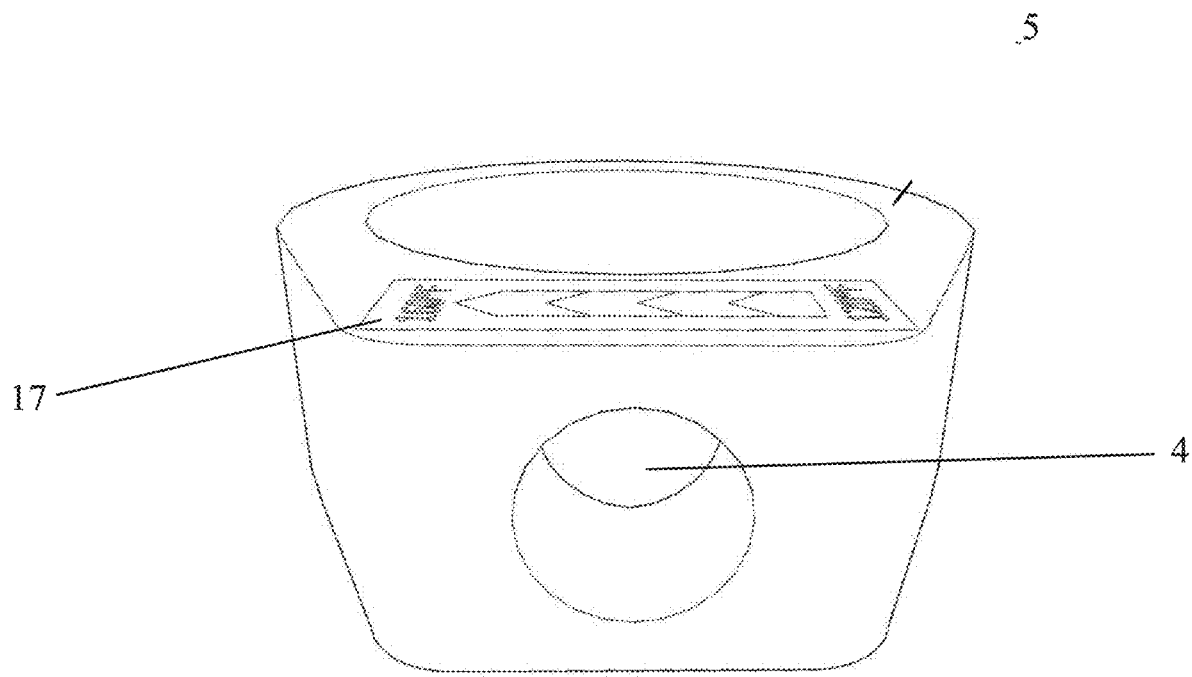
FIG. 16—is a front perspective view of a barrel thermal indicator in another alternative embodiment thereof.
Figure 17:
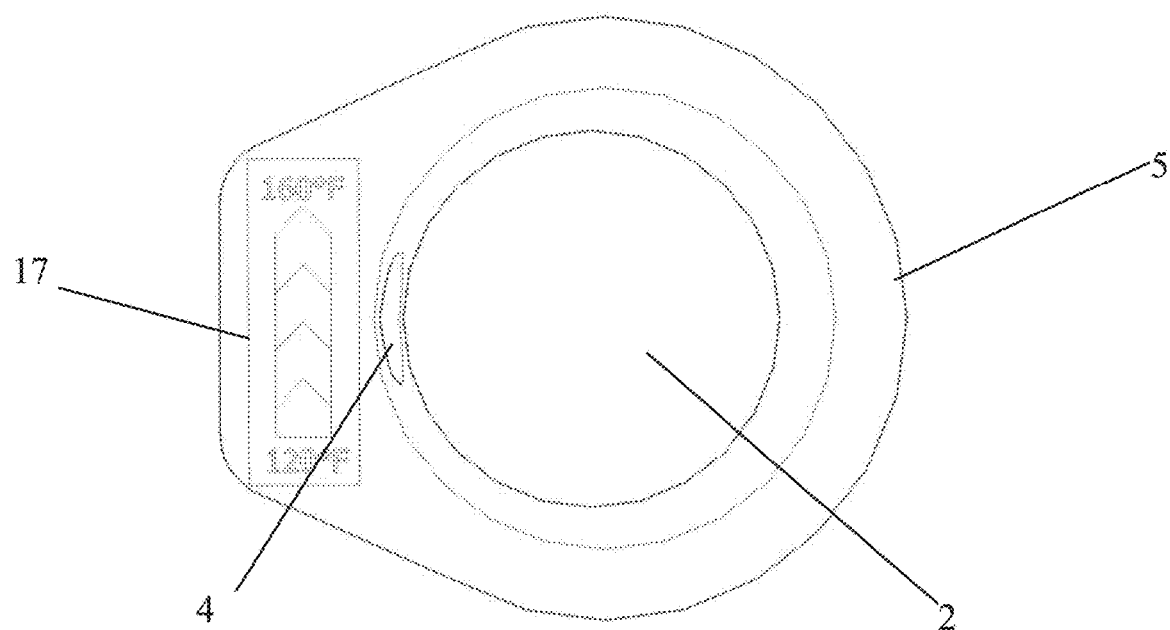
FIG. 17—is a front view of a barrel thermal indicator in another alternative embodiment thereof.
Figure 18:
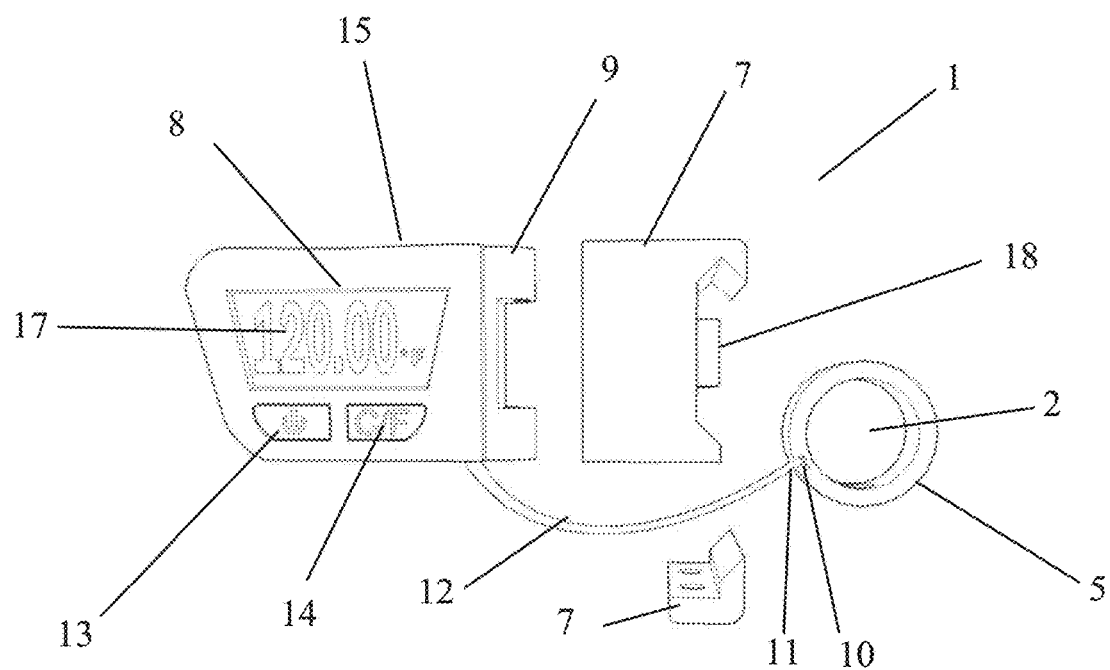
FIG. 18—is a front view of a digital barrel thermal indicator with a barrel coupler in one embodiment thereof.
Figure 19:
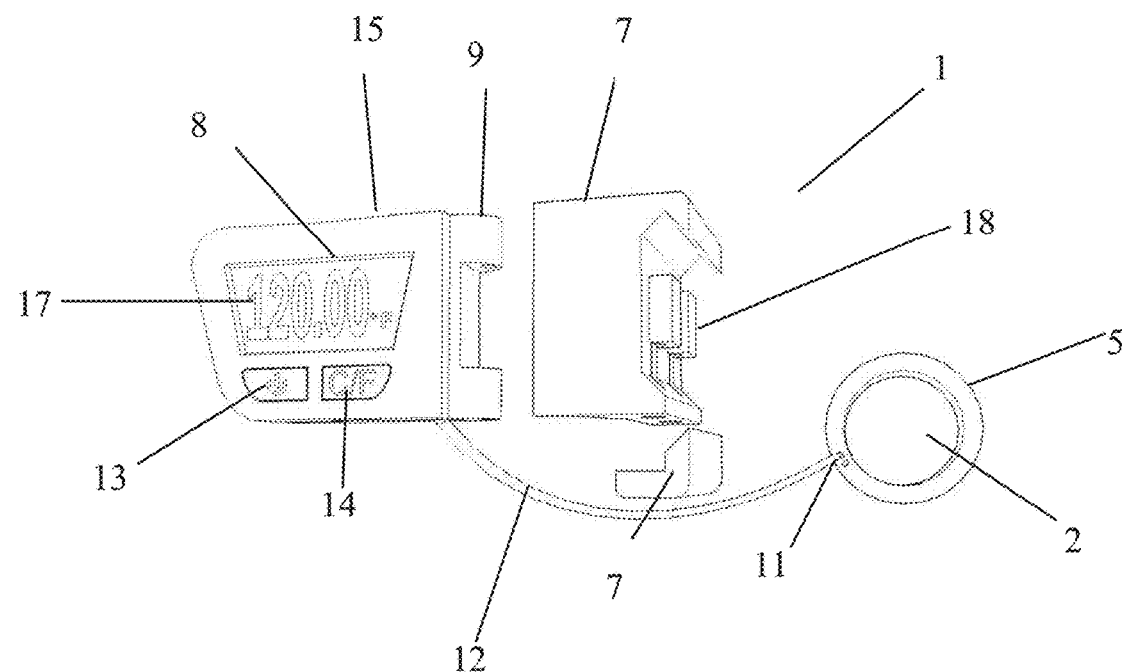
FIG. 19—is a perspective view of a digital barrel thermal indicator with a barrel coupler in one embodiment thereof.
Figure 20:
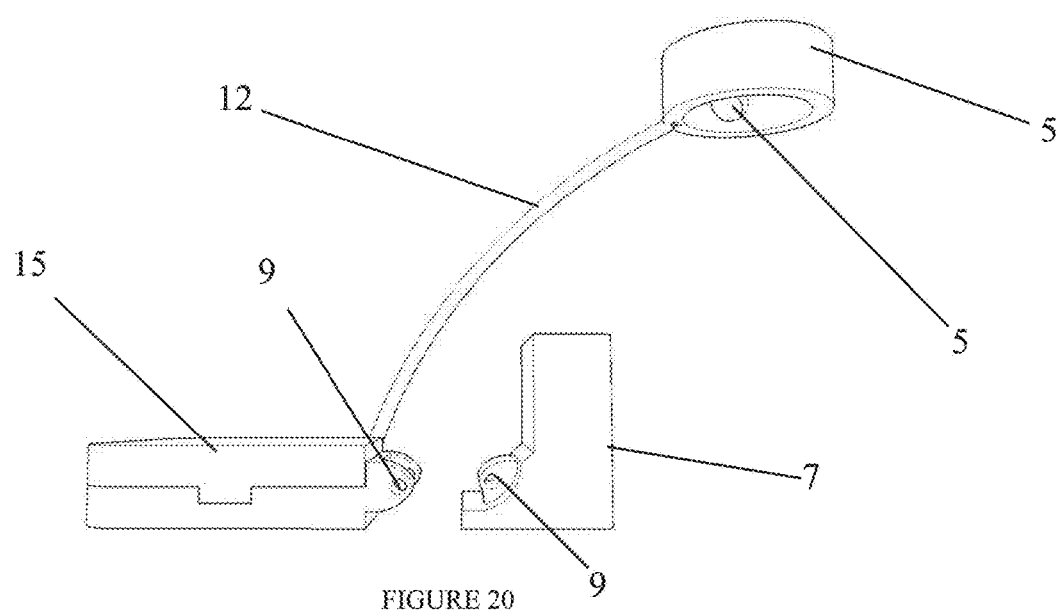
FIG. 20—is a top view of a digital barrel thermal indicator with a barrel coupler in one embodiment thereof.
Figure 21:
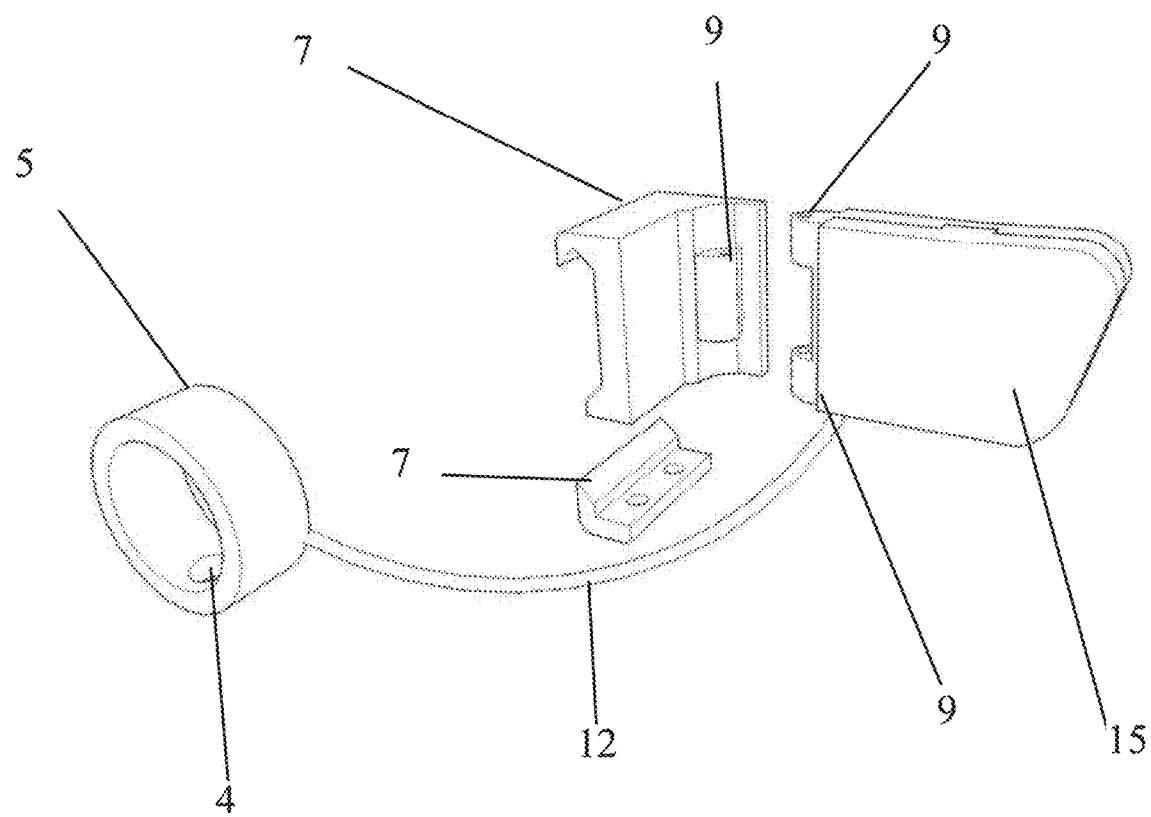
FIG. 21—is a back perspective view of a digital barrel thermal indicator with a barrel coupler in one embodiment thereof.
Figure 22:
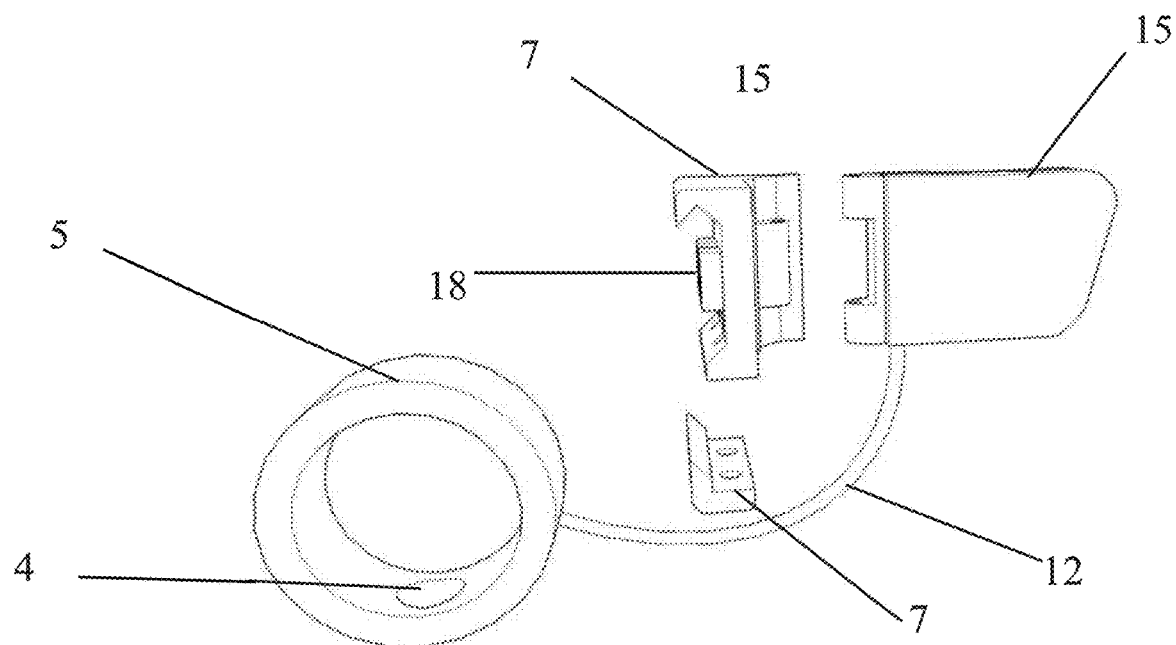
FIG. 22—is a back view of a digital barrel thermal indicator with a barrel coupler in one embodiment thereof.
Figure 23:
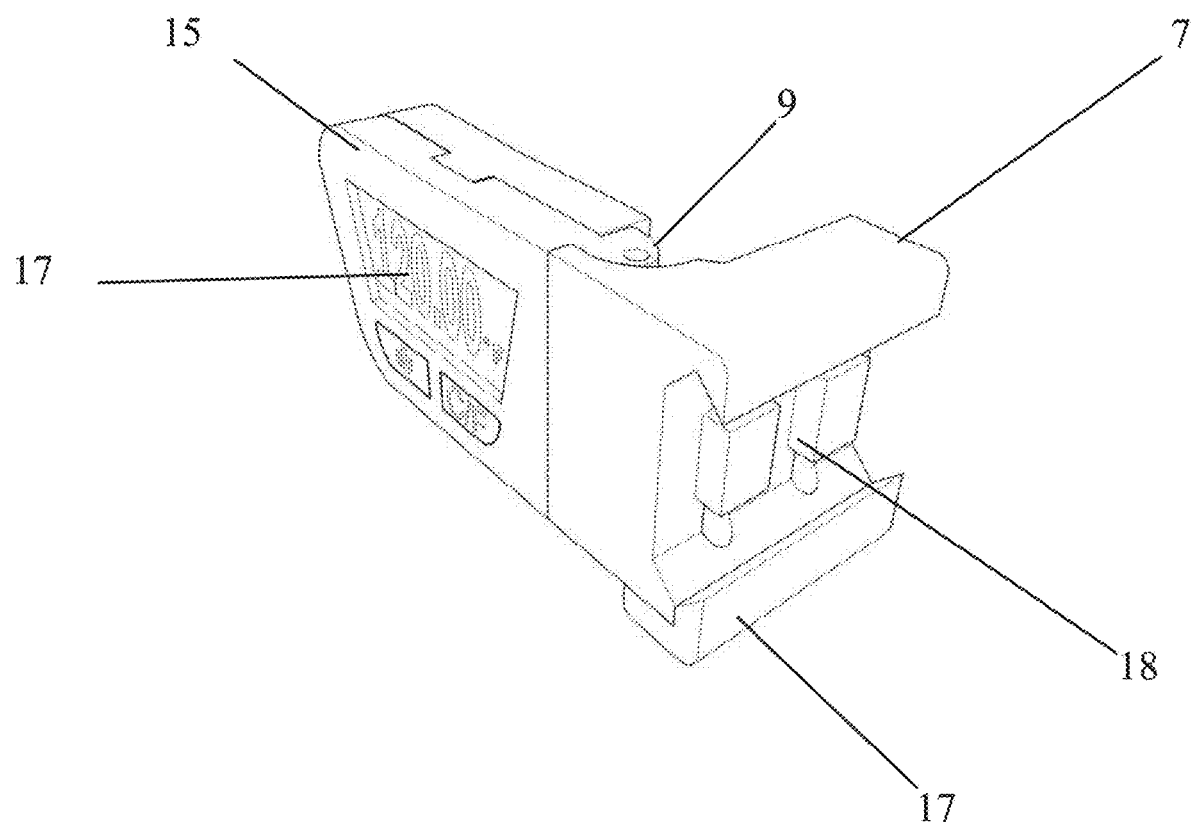
FIG. 23—is a front perspective view of a digital barrel thermal indicator in one embodiment thereof.
Figure 24:
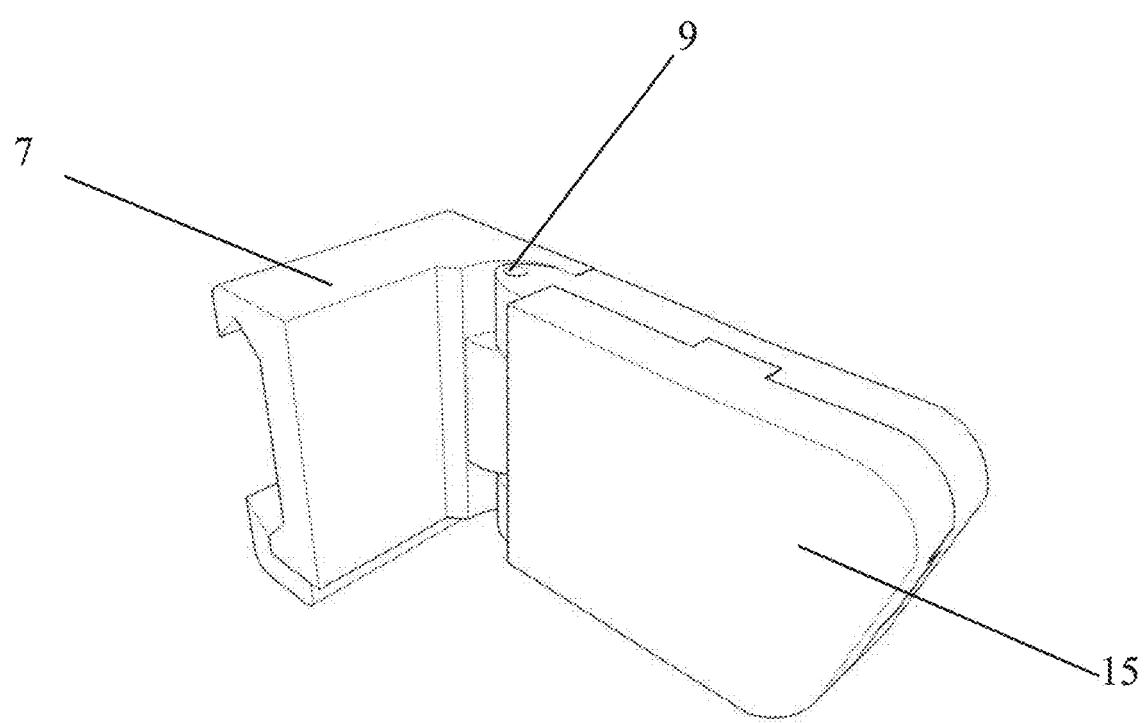
FIG. 24—is a back perspective view of a digital barrel thermal indicator in one embodiment thereof.
Figure 25:
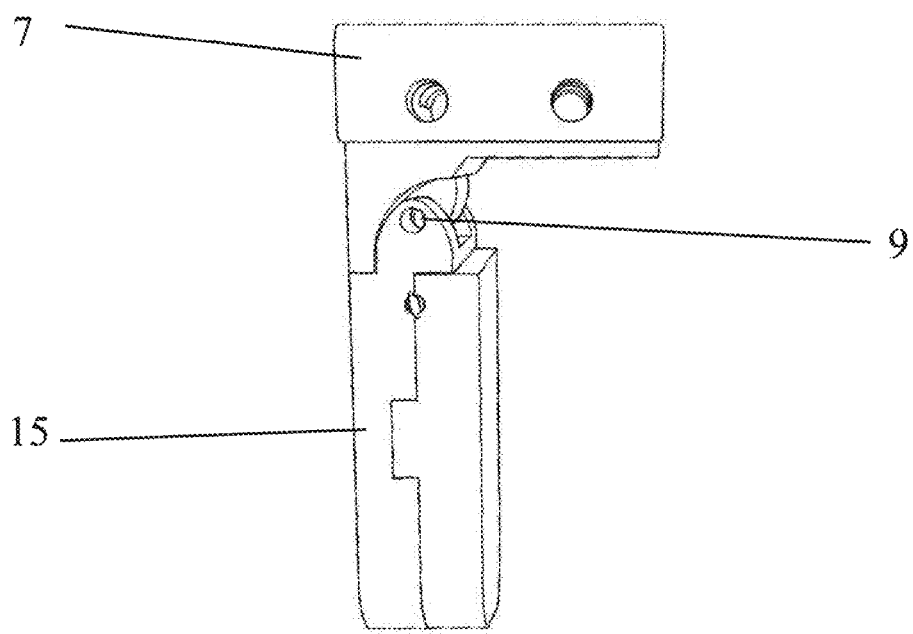
FIG. 25—is a bottom perspective view of a digital barrel thermal indicator in one embodiment thereof.
Figure 26:
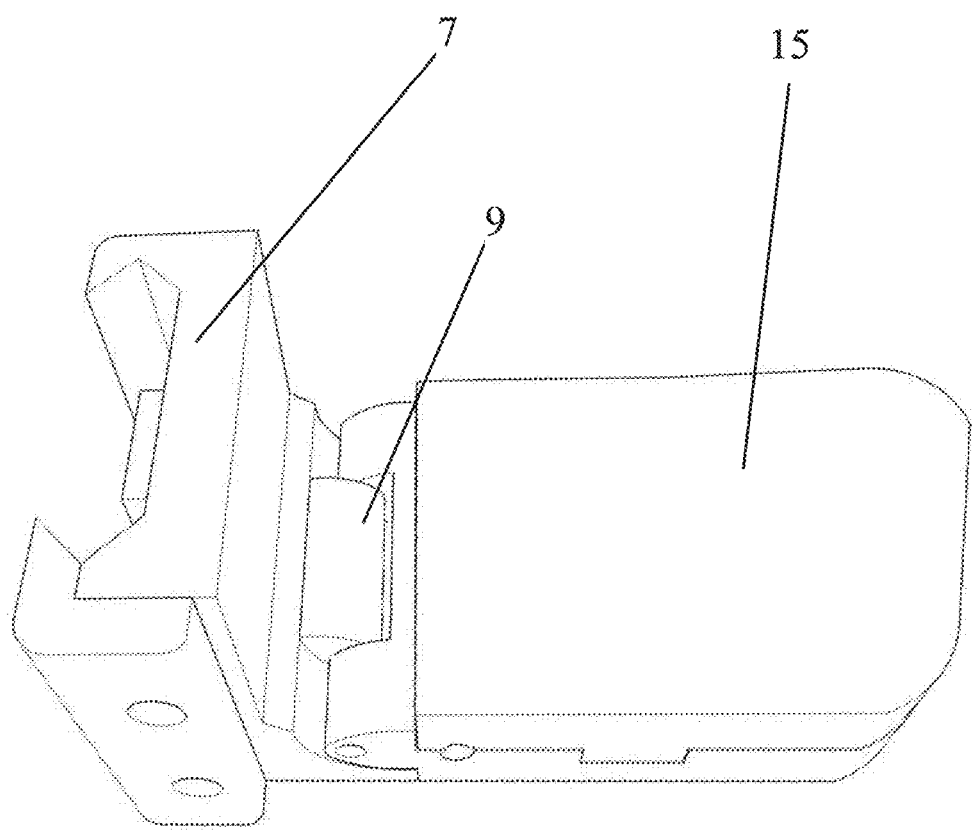
FIG. 26—is a back perspective view of a digital barrel thermal indicator in one embodiment thereof.
Figure 27:
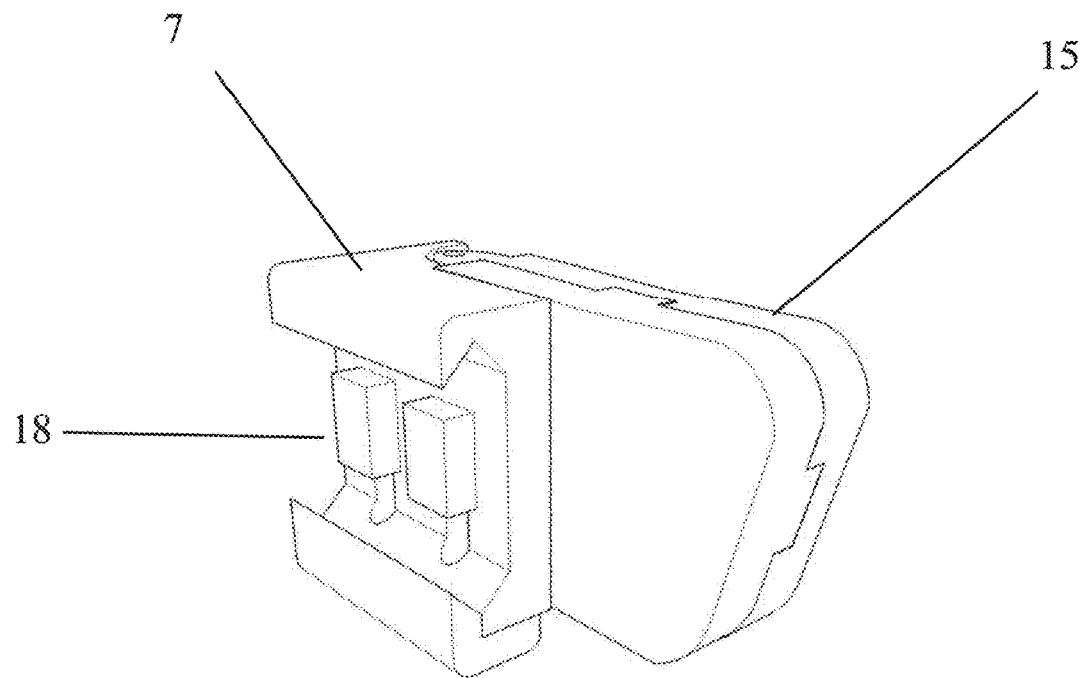
FIG. 27—is a side perspective view of a digital barrel thermal indicator with a retracted display housing in one embodiment thereof.
Figure 28:
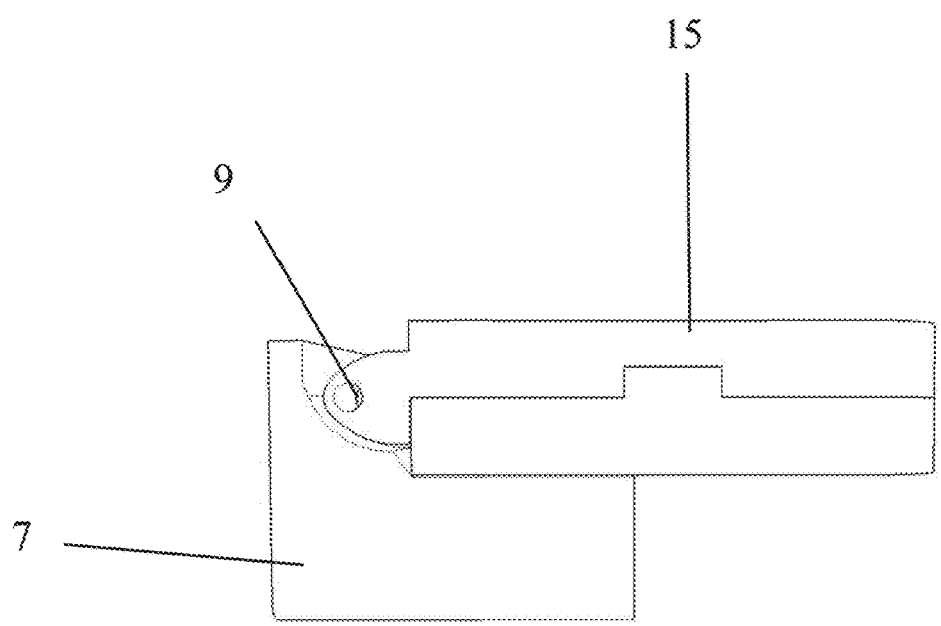
FIG. 28—is a top view of a digital barrel thermal indicator with a retracted display housing in one embodiment thereof.
Figure 29:
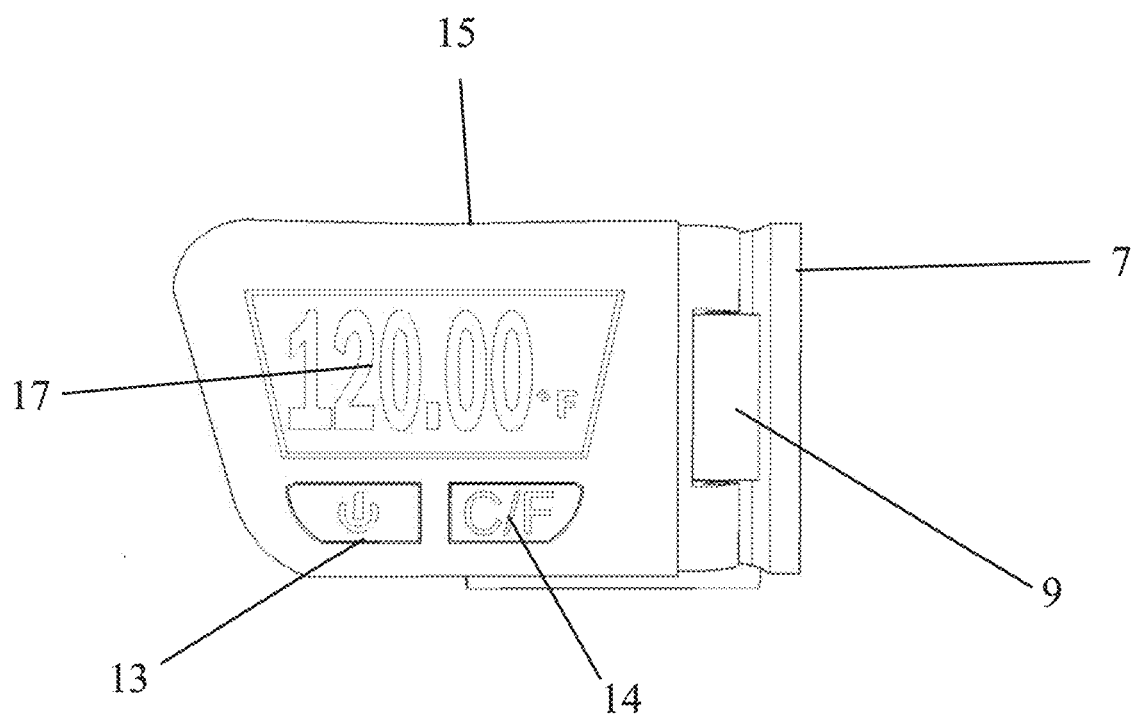
FIG. 29—is a front view of a digital barrel thermal indicator with a retracted display housing in one embodiment thereof.

In the embodiment shown in FIG. 8, for example, when the temperature of the barrel coupler (5) is below 140° Fahrenheit, no thermochromic indicator (3) will have transmitted a temperature signal. As the temperature of the barrel coupler (5) increases, a sequential segment of the thermochromic strip will transmit a temperature signal, for example through a visible color change. When the temperature of the barrel coupler (5) reaches, or exceeds 212°

Fahrenheit, all of the sequential segments of the thermochromic strip will be transmitting a temperature signal. In this manner, a user may quickly reference the approximate temperature of the gun barrel.

In additional embodiments, one or more thermochromic indicators secured to a barrel coupler (5) may be calibrated such that said thermal energy generated from said gun barrel may cause one or more thermochromic indicators to transmit a binary temperature signal. For example, as shown in FIGS. 9-12, when the temperature of the barrel coupler (5) is below 120° Fahrenheit, neither thermochromic indicator (3) will transmit a temperature signal. As the temperature of the barrel coupler (5) increases to 120° Fahrenheit or above, a first thermochromic indicator (3) will transmit a temperature signal, for example through a visible color change. When the temperature of the barrel coupler (5) reaches, or exceeds 160° Fahrenheit, both thermochromic indicators (3) will transmit a temperature signal.

Naturally, such temperature ranges are exemplary only and not meant to be limiting as to any embodiment. Indeed, a plurality of temperature signals may be transmitted to alert a user as to the approximate temperature of the gun barrel. For example, in certain embodiments, this temperature signal may include, but not be limited to: a numerical temperature signal, a color temperature signal, a color gradient temperature signal, a color indication, and a binary temperature signal, a warning temperature signal, a burn temperature signal, a store failure temperature signal, an accuracy temperature signal, an imminent barrel failure temperature signal, and a barrel failure temperature signal.

The inventive technology may include one or more thermochromic indicators (3) secured to a barrel coupler (5) and calibrated such that the thermal energy generated from a gun barrel causes the thermochromic indicator(s) (3) to transmit a temperature signal. In certain embodiments, a thermochromic indicator (3) secured to a barrel coupler (5) may be calibrated to account for the type of thermochromic indicator (3), the quantity of the thermochromic indicator (3), the gun barrel thickness, the type and amount of material used in the barrel coupler (5), the shape of the barrel coupler (5), the position of the thermochromic indicator (3) with respect to the gun barrel, and the heat transfer coefficient variation in the gun barrel and/or barrel coupler (5). This calibration may allow the thermal energy generated from the gun barrel to cause the thermochromic indicator (3) to transmit an approximately accurate temperature signal when the thermal energy from a gun barrel reaches at least one pre-determined temperature threshold.

As noted above, the inventive technology may provide a user a real-time temperature signal that may indicate the approximate temperature of a gun barrel. In this configuration, a user may be able to view a temperature signal in the guns line-of-sight without being otherwise obstructed. As shown in FIGS. 4-17, one or more thermochromic indicators (3) may be positioned so as to be facing a user. In these preferred embodiments, a thermochromic indicator (3) may be positioned on an extended portion of a barrel coupler (5) such that it may be visible within a user's line-of-sight while operating the firearm, but not in a position that would interfere with the sight-line or aim of the user. Additional embodiments may include an adjustable barrel coupler (5) that may allow the thermochromic indicator (3) to be moved out of the user's line-of-sight. Such adjustment may be accomplished through a swivel of twist joint and the like. Additional embodiments may also include placement of one or more thermochromic indicators (3) flush with, or proximal to the gun barrel and not visible in the user's line-of-sight.

Generally referring to FIGS. 13-17, in one embodiment, a barrel coupler (5) may be configured to detect and transmit, through a digital signal, the temperature of the gun barrel and/or barrel coupler (5) to a processor that may be positioned on or within the barrel coupler (5). This processor may be configured to receive this digital signal and convert it into a digital temperature indication (17). Additional embodiments may include a barrel coupler (5) that may secure a sensor, such as a laser temperature sensor, that may be configured to detect and transmit, through a digital signal, the temperature of the gun barrel.

A variety of digital temperature indications (17) may be encompassed by the inventive technology. In a preferred embodiment, a digital temperature indication (17) may be a digital numerical display that indicates the temperature of a barrel coupler or gun barrel. Additional digital temperature indications (17) may include color light indications as well as audio indications that may alert when a pre-determined temperature threshold is reached. For example, when a sensor in a barrel coupler (5) may detect that a gun barrel has reached a temperature that may cause burns, it may transmit a digital signal to a processor. This digital signal may be received by the processor and converted into a digital temperature indication (17) such a numerical, light and/or audio display may alert a user that the gun barrel has reached a temperature where it may cause burns.

Additional examples of digital temperature indications (17) include, but are not limited to: a color gradient digital temperature indication, a color digital temperature indication, a binary digital temperature indication, a warning digital temperature indication, a burn digital temperature indication, a store failure digital temperature indication, an accuracy digital temperature indication, a barrel failure digital temperature indication, a digital temperature indication associated with a pre-determined temperature threshold.

Additional embodiments may include a digital gun barrel thermal indication system having a separate digital display (8) that may be separately mounted to a weapon. Generally referring to FIGS. 18-29, in this embodiment a barrel coupler (5) may be configured to secure a barrel coupler sensor (11). This barrel coupler sensor (11) may be positioned in contact with, or proximally to a gun barrel and configured to measure and transmit the temperature of the gun barrel and/or barrel coupler (5) to a processor. In certain embodiments, a barrel coupler sensor (11) may be positioned within a sensor aperture on the barrel coupler (5) and further positioned to be in contact with, or proximally to a gun barrel. The digital transmission signal from the barrel coupler sensor (11) may be routed through a signal cable (12) or transmitted wirelessly to a processor configured to receive and convert the signal into a digital temperature indication (17). In this embodiment, one or more digital temperature indications (17) may be presented on a digital display (8).

In one preferred embodiment, a digital display (8) may be positioned within a display housing (15). This display housing (15) may be configured to be coupled with a display mount (7). In the embodiment shown in FIGS. 18-29, digital display (8) may be coupled with a display mount (7) through an adjustable joint, in this case a pivot joint (9). In this configuration, a user may pivot the display housing (15), securing the digital display (8) to an approximately perpendicular position with respect to the gun so as to be visible in the user's line of sight during use. In this instance, the term line-of-sight may mean being generally perceivable by a user when discharging a round. Conversely, in this configuration, a user may pivot the display housing (15) to an approximately parallel position with respect to the gun so as to be fully or partially removed from the user's line-of-sight.

In certain embodiments, a display housing (15) may secure one or more digital display controls that may be engaged to manipulate the digital temperature indications (17). Examples of such control may include a power button (13), or a clear button (14). Additional embodiments may include a toggle control to switch between different digital temperature indications (17), or different gun or barrel types. In this embodiment, the processer may be configured to compensate for a gun or barrel type to calibrate the sensor. In another embodiment, a toggle may include a feature to count rounds discharged and provide a digital signal when a pre-determined threshold is reached.

Again, referring to FIGS. 18-29, in this preferred embodiment a display mount (7) may include one or more separate components configured to be mounted to a gun. In this preferred embodiment, a display mount (7) may include one or more customizable coupler surfaces (18) that may be configured to be coupled with a gun, such as a customizable AR-15, or even a pistol. For example, in one preferred embodiment, a display mount (7) may be configured to be coupled with a rail mount or other component. Additional embodiments may include a magnet coupler or a snap, slide or quick-release type coupler that may be attached to a plurality of positions on the gun's frame or barrel.

Referring to FIGS. 30-34, the invention may include a gun temperature identification system (30) that can assist the gun operator as to the temperature of one or more gun components that may become heated during use, such as a gun barrel or receiver. In one preferred embodiment a gun temperature identification system (30). In this preferred embodiment, a thermochromic indicator may be applied to the surface of a gun component, such as a barrel or receiver, such that thermal energy generated within the gun component is transferred to the thermochromic indicator (3) causing it to transmit a temperature signal when said thermal energy from the gun component reaches a pre-determined temperature threshold. In this preferred embodiment, a thermochromic indicator may include one or more of the following: a thermochromic paint (35) or powder coat (31) applied to the gun component; a thermochromic sticker (32) applied to the gun component; and a thermochromic vinyl wrap (33) applied to the gun component. Such gun components may include a barrel (34), an upper receiver, a lower receiver, a chassis, a hand guard, a scope, a suppressor, and a stock.

Figure 30:
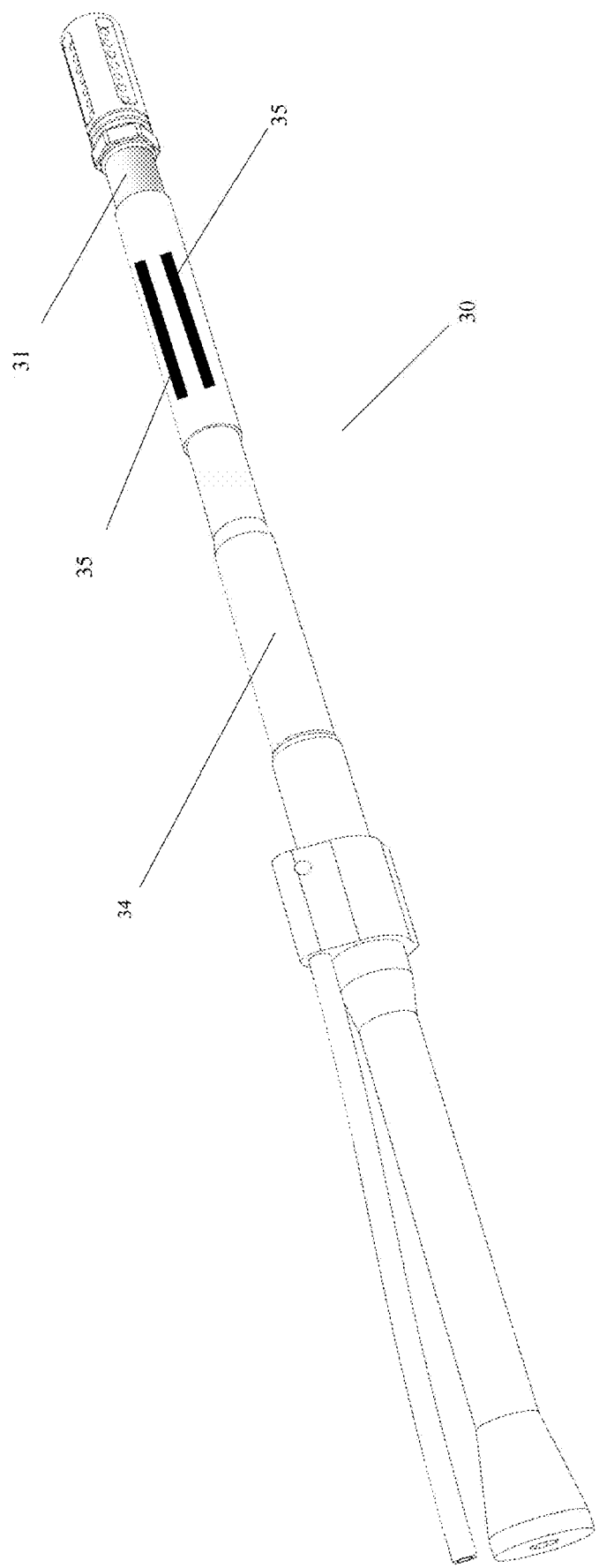
FIG. 30—is a perspective view of a gun barrel having a direct application of a thermochromic indicator, which in this example includes a thermochromic paint and/or powder coating applied directly to the terminal end of the barrel in one embodiment thereof.

As used herein, and shown in FIG. 30, with respect to a gun temperature identification system (30), a "thermochromic paint" (35) refers to a paint that can be applied to a gun component and that contains one or more thermochromic properties. In a thermochromic paint may include one or more thermochromic pigments that transmit a temperature signal through a color change in response to a threshold amount of thermal energy or heat.

As used herein, and shown in FIG. 30, with respect to a gun temperature identification system (30), a "thermochromic powder coat" (31) refers to a dry powder coating containing one or more thermochromic components that may be applied electrostatically to the surface of a gun component and then cured under heat or with ultraviolet light. In one embodiment the dry powder may be a thermoplastic or a thermoset polymer containing one or more thermochromic components, such as thermochromic pigments.

Figure 31:
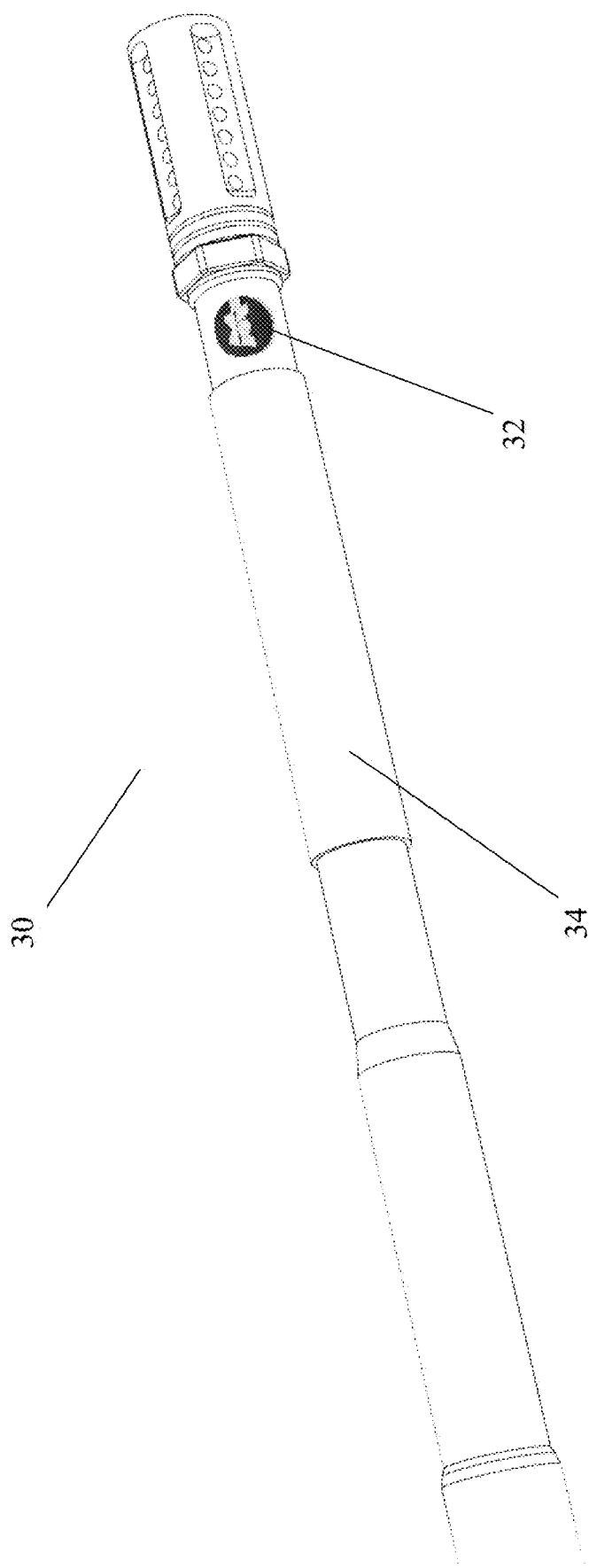
FIG. 31—is a perspective view of a gun barrel having a thermochromic indicator, which in this example includes a thermochromic sticker, positioned at the terminal end of the barrel in one embodiment thereof.
Figure 32:
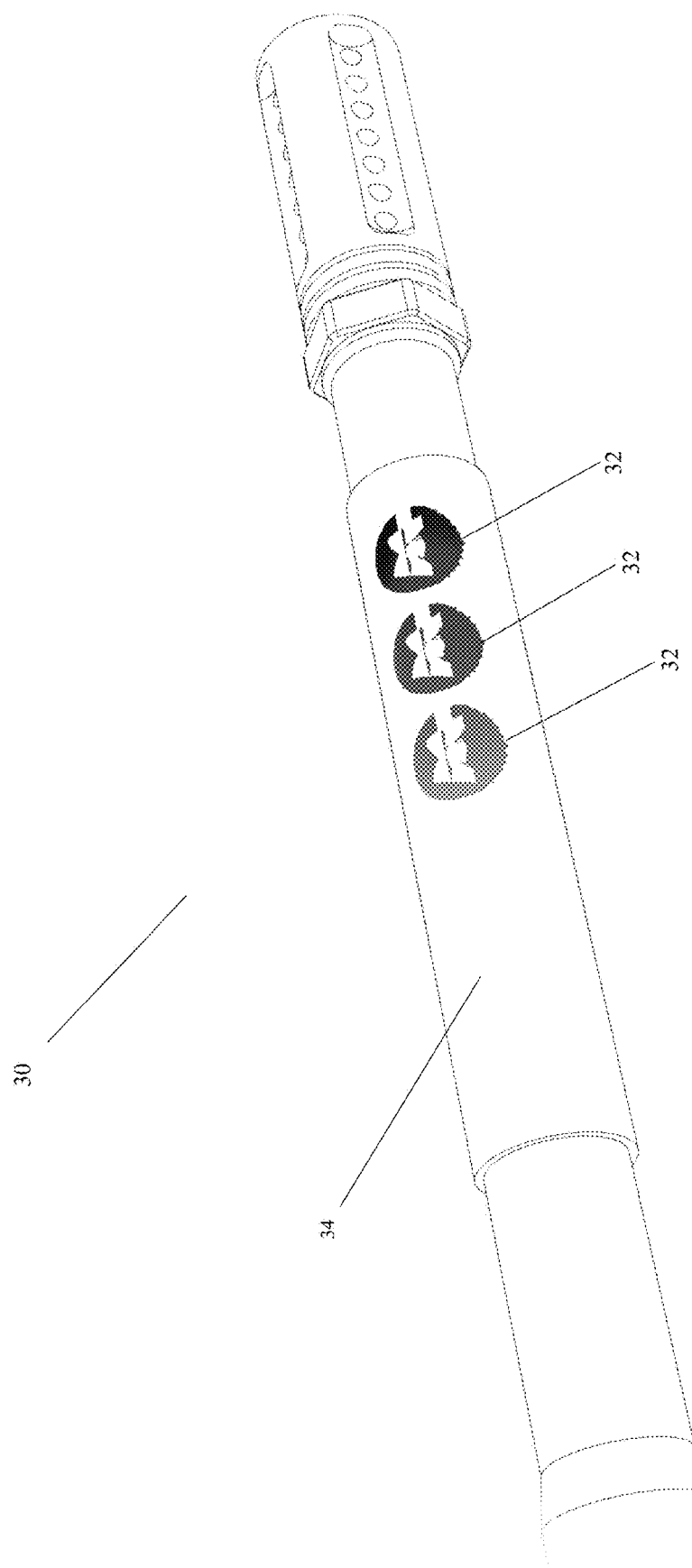
FIG. 32—is a perspective view of a gun barrel having a plurality of thermochromic indicators, which in this example includes a plurality of thermochromic stickers each configured to have different temperature signals, positioned on the barrel in one embodiment thereof.
Figure 33:
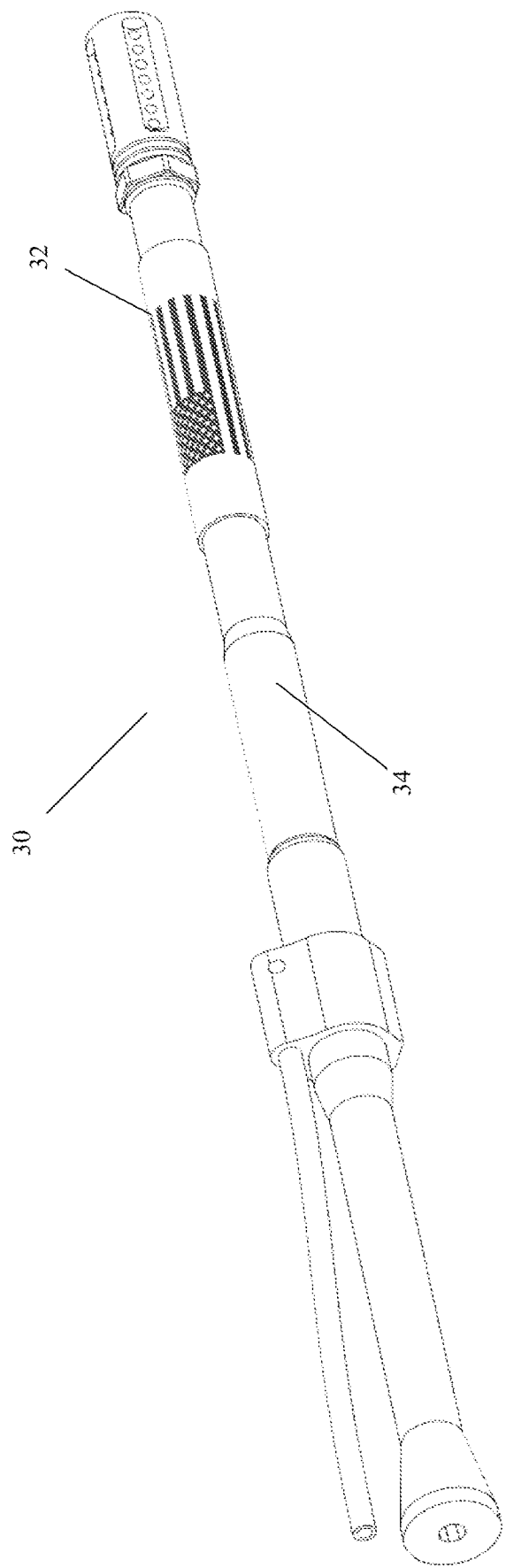
FIG. 33—is a perspective view of a gun barrel having a thermochromic indicator, which in this example includes a thermochromic sticker that may further include separate regions configured to have different temperature signals, positioned on the barrel in one embodiment thereof.

As used herein, and shown in FIGS. 31-33, with respect to a gun temperature identification system (30), a "thermochromic sticker" (32) refers to a thermochromic attachment that be permanently or temporarily adhered to the surface of a gun component, such as a gun barrel. This thermochromic attachment may include two surfaces. A bottom surface may include an adhesive surface that may further include a heat tolerant adhesive. The top surface may be configured to display a temperature signal, for example through the activation of thermochromic material embedded within, or on top of the attachment.

Figure 34:
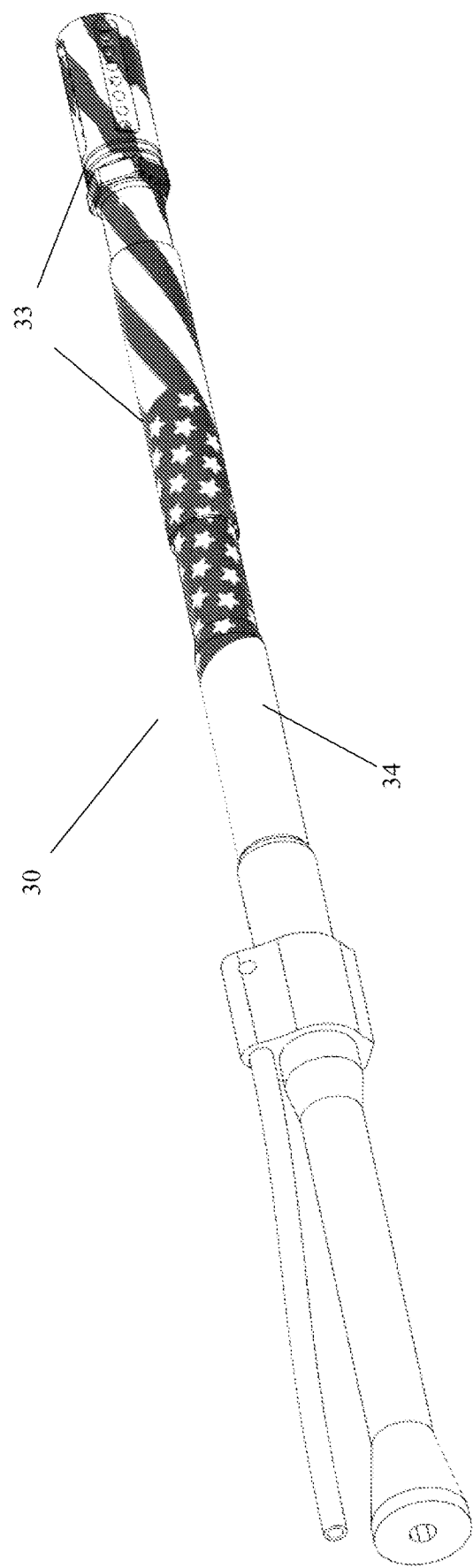
FIG. 34—is a perspective view of a gun barrel having a thermochromic indicator, which in this example includes a vinyl wrap that may further include separate regions configured to have different temperature signals, positioned on the barrel in one embodiment thereof.

As used herein, and shown in FIG. 34, with respect to a gun temperature identification system (30), a "thermochromic vinyl wrap" (33) refers to a vinyl wrap that be permanently or temporarily adhered to the surface of a gun component, such as a gun barrel. This vinyl wrap may include two surfaces. A bottom surface may include an adhesive surface that may further include a heat tolerant adhesive. The top surface may be configured to display a temperature signal, for example through the activation of thermochromic material embedded within, or on top of the vinyl wrap.

In preferred embodiments, a thermochromic indicator, such as a thermochromic paint or powder coat (31), a thermochromic sticker (32), and a thermochromic vinyl wrap (33) may be directly applied to the surface of said gun component and further calibrated to account for the at least one of the following: the type of thermochromic indicator, the quantity of thermochromic indicator, said gun component thickness, the heat transfer coefficient variation in said gun component such that said thermal energy generated from said gun component causes said thermochromic indicator to transmit a temperature signal, such as a color change, when said thermal energy from said gun component reaches at least one pre-determined temperature threshold. As noted above, pre-determined temperature threshold may include: a touch temperature threshold, a store temperature threshold, an accuracy temperature threshold, an imminent component failure temperature threshold, and a component failure temperature threshold as generally described herein.

In preferred embodiments, a plurality of thermochromic indicators, such as a thermochromic paint (35) or powder coat (31), a thermochromic sticker (32), and a thermochromic vinyl wrap (33), or any combination thereof, may be directly or indirectly applied to the surface of said gun component. As shown in FIGS. 30, and 32, a plurality of thermochromic indicators may be directly or indirectly applied to the surface of said gun component. In this embodiment, each of the thermochromic indicators may be differentially calibrated so as to transmit a different temperature signal at a different pre-determined temperature threshold. For example, as shown in FIG. 32, in this embodiment three thermochromic stickers, each being calibrated to provide a temperature indication at a different pre-determined temperature, may be applied to the surface of, in this case a gun barrel. In this configuration, each thermochromic sticker may undergo a color change as each sequential threshold temperature is met.

For example, a first thermochromic sticker may undergo a color change when a touch temperature threshold is met, which a second thermochromic sticker may undergo a color change when a store temperature threshold is met, and a third thermochromic sticker may undergo a color change when an accuracy temperature threshold is met, and so on.

In this embodiment, the sticker may be position within the user's general line of sight when using the firearm so that the temperature of the components can be easily monitored during use. Notably, a first second and third thermochromic stickers are exemplary only as they can include any of the thermochromic indicators provided herein, and in particular thermochromic paint (35), powder coat (31), and a thermochromic vinyl wrap (33), or any combination thereof. For example, a gun component such as a barrel may include a plurality of regions covered in different calibrated thermochromic paint (35), powder coat (31) and operate as generally described above.

In further embodiments, a single thermochromic sticker (32) or thermochromic vinyl wrap (33) or any combination thereof, may include multiple thermochromic regions (35) that may each be differentially calibrated so as to transmit a different temperature signal at a different pre-determined temperature threshold. For example, as shown in FIG. 33, in this embodiment a thermochromic sticker (32), may include a plurality of thermochromic regions (35) each being calibrated to provide a temperature indication at a different pre-determined temperature, that may be applied to the surface of, in this case a gun barrel. In this configuration, the thermochromic regions (35) may undergo a color change as each sequential threshold temperature is met.

In further embodiments, the thermochromic regions (35) may be configured so as to present, or reveal a design element as a temperature, or sequence or temperature thresholds are met. For example, in the embodiment shown in FIG. 33-34, the flag design presented in a thermochromic sticker or vinyl wrap, may be calibrated to provide a red temperature indication at a first temperature threshold, a blue temperature indication at a first temperature threshold. A white regions may include a region having no thermochromic indicator, or a white thermochromic indicator. As noted above, this same design reveal may also be accomplished using thermochromic paint (35), or powder coat (31), or a combination thereof. For example, a gun component such as a barrel may include a plurality of regions covered in different calibrated thermochromic paint (35), or powder coat (31) and may reveal a design element as the component meets specific predetermined thresholds. Notably, the design elements shown in the figures are exemplary and may include a variety of shapes, configurations, artistic elements, and/or word elements.

All embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to generate a gun barrel thermal indicator and the like. In this application, the methods and apparatus for the aforementioned systems are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in method-oriented terminology, each element of the claims corresponds to a device. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupling method and/or technique, and/or device" and the like. Such changes and alternative terms are to be understood to be explicitly included in the description.

Any patents, publications, or other references mentioned in this application for patent, such as in the specification or an IDS are hereby incorporated herein by reference in their entirety. Any priority case(s) claimed by this application is hereby appended and hereby incorporated herein by reference in their entirety. Finally, all references listed in the list of References To Be Incorporated By Reference In Accordance With The Patent Application or other information disclosure statement and the like filed with the application are hereby appended and hereby incorporated herein by reference in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the methods and/or apparatus for providing a gun barrel thermal indicator system as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuationin-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

What is claimed is:

1. A firearm temperature identification system comprising:
    at least one firearm component having:
        a non-thermochromic design element applied to the surface of said component; and
        a thermochromic indicator applied to the surface of said firearm component such that all or part of the non-thermochromic design element is not visible;
    wherein said thermochromic indicator is configured to transmit a temperature signal when thermal energy generated from said firearm component reaches at least one pre-determined temperature threshold; and
    wherein when said pre-determined temperature threshold is met, the thermochromic indicator transmits the temperature signal by becoming translucent thereby revealing the non-thermochromic design applied to the firearm component.

2. The system of claim 1, wherein said firearm component comprises a firearm component selected from the group consisting of: a barrel, an upper receiver, a lower receiver, a chassis, a hand guard, a scope, a suppressor, and a stock.

3. The system of claim 1, wherein said pre-determined temperature threshold comprises a pre-determined temperature threshold selected from the group consisting of: a touch temperature threshold, a store temperature threshold, an accuracy temperature threshold, an imminent component failure temperature threshold, and a component failure temperature threshold.

4. The system of claim 1, wherein said thermochromic indicator applied to the surface of said firearm component comprises a thermochromic indicator selected from the group consisting of: a thermochromic paint, a thermochromic powder coating, a thermochromic sticker, and a thermochromic vinyl wrap.

5. The system of claim 4, wherein said thermochromic indicator applied to the surface of said firearm component comprises one or more thermochromic indicators calibrated to account for the at least one of the following: the type of thermochromic indicator, the quantity of thermochromic indicator, said firearm component thickness, and the heat transfer coefficient variation in said firearm component such that said thermal energy generated from said firearm component causes said thermochromic indicator to transmit the temperature signal when said thermal energy from said firearm component reaches said at least one pre-determined temperature threshold.

6. The system of claim 1, wherein said thermochromic indicator comprises a plurality of thermochromic indicators wherein each of said thermochromic indicators are differentially calibrated so as to transmit a different temperature signal by becoming translucent thereby revealing the non-thermochromic design applied to the firearm component at a different pre-determined temperature threshold, thereby revealing different portions of the non-thermochromic design at different pre-determined temperature thresholds.

7. The system of claim 6, wherein said pre-determined temperature threshold comprises a plurality of sequential pre-determined temperature thresholds.

8. A firearm suppressor temperature indication system comprising:
    a firearm suppressor having:
        a non-thermochromic design element applied to the surface of said firearm suppressor; and
        a thermochromic indicator applied to the surface of said firearm suppressor such that the non-thermochromic design element is not visible, wherein thermal energy generated by the discharge of one or more rounds released outward from the terminal end of a barrel of the firearm is transferred to said thermochromic indicator on said firearm suppressor;
    wherein said thermochromic indicator is calibrated such that the thermal energy causes said thermochromic indicator to transmit a temperature signal when said thermal energy reaches at least one pre-determined temperature threshold;
    wherein said thermochromic indicator includes at least one of the following:
        a thermochromic powder coat applied to the suppressor;
        a thermochromic paint applied to the suppressor;
        a thermochromic sticker applied to the suppressor; and
        a thermochromic vinyl wrap applied to the suppressor; and
    wherein when the pre-determined temperature threshold is reached, the thermochromic indicator transmits a temperature signal by becoming translucent thereby revealing the non-thermochromic design.

9. The system of claim 8, wherein said thermochromic indicator applied to the surface of said firearm suppressor comprises one or more thermochromic indicators calibrated to account for the at least one of the following: the type of thermochromic indicator, the quantity of thermochromic indicator, said firearm suppressor thickness, and the heat transfer coefficient variation in said firearm suppressor such that said thermal energy generated from said firearm suppressor causes said thermochromic indicator to transmit the temperature signal when said thermal energy from said firearm suppressor reaches said at least one pre-determined temperature threshold.

10. The system of claim 8, wherein said pre-determined temperature threshold comprises a pre-determined temperature threshold selected from the group consisting of: a touch temperature threshold, a store temperature threshold, an accuracy temperature threshold, an imminent suppressor failure temperature threshold, and a suppressor failure temperature threshold.

11. The system of claim 8, wherein said thermochromic indicator comprises a plurality of thermochromic indicators wherein each of said thermochromic indicators is differentially calibrated so as to transmit a different temperature signal by becoming translucent at a different pre-determined temperature threshold.

12. The system of claim 11, wherein said plurality of thermochromic indicators comprise a plurality of thermochromic indicators wherein each of said thermochromic indicators is differentially calibrated so as to become translucent in response to different pre-determined temperature thresholds, and sequentially reveal all or part of the non-thermochromic design element.

13. A thermochromic firearm barrel comprising:
a firearm barrel having:
- a non-thermochromic design element applied to the surface of said firearm barrel;
- a thermochromic indicator applied to the surface of said firearm barrel such that the non-thermochromic design element is not visible, wherein thermal energy generated by the discharge of one or more rounds is transferred to said thermochromic indicator;
- wherein said thermochromic indicator is configured to transmit a temperature signal by becoming translucent thereby revealing the non-thermochromic design when said thermal energy from said firearm barrel reaches at least one pre-determined temperature threshold.

14. The thermochromic gun barrel of claim 13, wherein said thermochromic indicator applied to the surface of said firearm barrel comprises a thermochromic indicator selected from the group consisting of: a thermochromic paint, a thermochromic powder coating; a thermochromic sticker, a thermochromic vinyl wrap.

15. The thermochromic firearm barrel of claim 13, wherein said thermochromic indicator comprises a plurality of thermochromic indicators wherein each of said thermochromic indicators is differentially calibrated so as to transmit a different temperature signal by becoming translucent thereby revealing the non-thermochromic design applied to the firearm barrel at a different pre-determined temperature threshold, thereby revealing different portions of the non-thermochromic design at different pre-determined temperature thresholds.

* * * * *